US012465849B2

(12) United States Patent
Yokota et al.

(10) Patent No.: US 12,465,849 B2
(45) Date of Patent: Nov. 11, 2025

(54) STORAGE MEDIUM, INFORMATION PROCESSING APPARATUS, INFORMATION PROCESSING SYSTEM, AND GAME PROCESSING METHOD

(71) Applicant: NINTENDO CO., LTD., Kyoto (JP)

(72) Inventors: Genki Yokota, Kyoto (JP); Yuki Sakamoto, Kyoto (JP); Koh Kojima, Tokyo (JP); Mitsuhiro Hagi, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 404 days.

(21) Appl. No.: 18/148,752

(22) Filed: Dec. 30, 2022

(65) Prior Publication Data

US 2023/0330524 A1 Oct. 19, 2023

(30) Foreign Application Priority Data

Apr. 13, 2022 (JP) ................................ 2022-066404

(51) Int. Cl.
*A63F 13/42* (2014.01)
*A63F 13/44* (2014.01)
(Continued)

(52) U.S. Cl.
CPC .............. *A63F 13/42* (2014.09); *A63F 13/44* (2014.09); *A63F 13/56* (2014.09); *A63F 13/833* (2014.09)

(58) Field of Classification Search
CPC .......... A63F 13/42; A63F 13/44; A63F 13/56; A63F 13/833; A63F 13/533; A63F 13/822; A63F 13/58
See application file for complete search history.

(56) References Cited

U.S. PATENT DOCUMENTS

2017/0266557 A1 9/2017 Fujiwara et al.
2020/0368622 A1* 11/2020 Kando .................. G06F 1/1669

FOREIGN PATENT DOCUMENTS

JP 2016144527 A 8/2016
JP 2017164313 A 9/2017
JP 2020188986 A 11/2020

OTHER PUBLICATIONS

Decision to Grant a Patent dated Sep. 28, 2023 received in Japanese Patent Application No. JP 2022-066404.

(Continued)

*Primary Examiner* — Thomas H Henry
(74) *Attorney, Agent, or Firm* — Scully, Scott, Murphy & Presser, P.C.

(57) ABSTRACT

When any one of a plurality of types of first operations respectively corresponding to a plurality of types of commands associated with each playable character is performed and the commands are executable, an example of an information processing system performs control such that an operation target character performs actions corresponding to the commands. When a second operation is performed, the information processing system switches the operation target character to another character among a plurality of the playable characters. When a third operation is performed in a state where a character included in a first set is the operation target character, and a first special character is appearable, the information processing system performs control such that the first special character appears in a virtual space and is set as the operation target character.

22 Claims, 17 Drawing Sheets

(51) Int. Cl.
*A63F 13/56* (2014.01)
*A63F 13/833* (2014.01)

(56) References Cited

OTHER PUBLICATIONS

Xenoblade 2 The Complete Guide, reprint, Kadokawa Corporation, Nov. 15, 2018, p. 016, ISBN: 978-4-04-893657-6.
"Xenoblade 2 battle [driverarts]", [online], [searched on Apr. 5, 2022], internet <https://www.youtube.com/watch?v=xZ4nwqE6odk&t=1s>.

* cited by examiner

STORAGE MEDIUM, INFORMATION PROCESSING APPARATUS, INFORMATION PROCESSING SYSTEM, AND GAME PROCESSING METHOD

CROSS REFERENCE TO RELATED APPLICATION

This application claims priority to Japanese Patent Application No. 2022-66404, filed on Apr. 13, 2022, the entire contents of which are incorporated herein by reference.

FIELD

The technique shown here relates to a storage medium, an information processing apparatus, an information processing system, and a game processing method for executing a battle scene in a game.

BACKGROUND AND SUMMARY

Conventionally, there is a game in which, in a battle scene, a gauge increases according to the progress of the game, and a specific command (e.g., a command to use a specific skill or item, etc.) is made executable when the gauge becomes accumulated. In such a game, by setting a condition that the gauge becomes accumulated as a condition for command execution, the specific command is preventing from being excessively frequently made executable, thereby improving the strategic characteristics of the game.

In the game with the battle system described above, a user has to wait for the gauge to become accumulated, in order to perform an instruction to execute the specific command. While taking advantage of the strategic characteristics of such a battle system, it is desirable that while a gauge for a certain command is not accumulated, the user can select and make an instruction from a larger number of options, in addition to simply waiting for the gauge to become accumulated.

Therefore, the present application discloses a storage medium, an information processing apparatus, an information processing system, and a game processing method that allow many operation options to be presented to a user in a battle scene of a game.

(1)

An example of a non-transitory computer-readable storage medium described herein a game program for causing a computer of an information processing apparatus to control a battle scene in which a plurality of playable characters fight against an enemy character in a virtual space. The game program causing the computer to, in the battle scene, execute controlling an action performed by an operation target character based on an operation input, the operation target character being one of the plurality of playable characters. The game program causing the computer to, in a state where any one of the plurality of playable characters is the operation target character, execute: for a plurality of types of commands associated with each of the playable characters, controlling a state of each command about whether the command is executable or non-executable; when any one of a plurality of types of first operations respectively corresponding to the plurality of types of commands is performed and the command corresponding to the performed first operation is executable, performing control such that the operation target character performs an action corresponding to the command, and controlling the state of the command such that the command is non-executable; for a command that is non-executable, when a predetermined condition set for each command is satisfied, controlling the state of the command such that the command is executable; automatically controlling an action performed by a character that is not the operation target character among the plurality of playable characters; when a second operation is performed, switching the operation target character to another character among the plurality of playable characters; for a first special character associated with a combination of a first set including a first character and a second character included in the plurality of playable characters, controlling a state of a first special character about whether the first special character is appearable or non-appearable; and when a third operation is performed in a state where a character included in the first set is the operation target character, and the first special character is appearable, performing control such that the first special character appears in the virtual space and is set as the operation target character. The game program causing the computer to, in a state where the first special character is the operation target character, execute: when at least any one of the plurality of types of first operations is performed, controlling an action performed by the first special character, such that the first special character performs an action corresponding to a command corresponding to the performed operation and associated with the first special character; switching the operation target character from the first special character to a character other than the first set among the plurality of playable characters according to the second operation; when a predetermined condition including passage of time is satisfied, controlling the state of the first special character such that the first special character is non-appearable; and when the first special character is changed to a state where the first special character is non-appearable or when a fourth operation is performed, switching the operation target character from the first special character to a character included in the first set.

According to the configuration of the above (1), by making it possible to switch the operation target character and cause the special character to appear at a timing when the commands cannot be executed, many operation options can be presented to the user in the battle scene.

(2)

In the configuration of the above (1), the game program may cause the computer to control the state of the first special character such that the first special character is appearable, when a predetermined condition including passage of time is satisfied in a state where the first special character is non-appearable.

According to the configuration of the above (2), in the battle scene, the special character that has become impossible to appear can be caused to appear again according to the passage of time.

(3)

In the configuration of the above (2), information indicating the state of the first special character about whether the first special character is appearable or non-appearable may include at least information indicating whether the first special character is appearable or non-appearable and information regarding a remaining appearable time. The game program may cause the computer to, in a state where the first special character appears, decrease the remaining appearable time at least according to passage of time; when the remaining appearable time runs out, change the state of the first special character such that the first special character is non-appearable, and perform control such that the first special character leaves the virtual space; and when the fourth operation is performed in a state where the remaining appearable time remains, perform control such that the first special character leaves the virtual space with the state of the first special character kept as a state where the first special character is appearable. The game program may cause the computer to, in a state where the first special character does not appear, increase the remaining appearable time according to passage of time; and when the remaining appearable time reaches a predetermined amount in a state where the first special character is non-appearable, change the state of the first special character such that the first special character is appearable.

According to the configuration of the above (3), when the user causes the special character to leave by their own operation, it can be made easier to cause the special character to appear again than when the special character automatically leaves. Accordingly, an option of whether or not the user manually causes the special character to leave can be provided to the user, so that the strategic characteristics of the game can be improved.

(4)

In the configuration of the above (3), the game program may cause the computer to, in a state where the first special character is the operation target character, decrease the remaining appearable time in accordance with a command associated with the first special character being executed.

According to the configuration of the above (4), the difficulty of the game can be prevented from becoming excessively low by the user frequently executing the command in a situation in which the special character appears.

(5)

In the configuration of the any one of above (1) to (4), a first command pattern and a second command pattern may be associated with the first special character. The first command pattern is corresponding to the first character and is a pattern of commands corresponding to at least any one of the plurality of types of first operations. The second command pattern is corresponding to the second character and is a pattern of commands corresponding to at least any one of the plurality of types of first operations. The game program may further cause the computer to, when a fifth operation is performed in a state where the first special character is the operation target character, change a pattern of commands used for the first special character, from the first command pattern to the second command pattern or from the second command pattern to the first command pattern.

According to the configuration of the above (5), the user can execute many commands for the special character, so that more options can be presented to the user in the battle scene.

(6)

In the configuration of the any one of above (1) to (5), the game program may further cause the computer to: automatically control attack actions performed on the enemy character by the plurality of playable characters; and for at least one command among the plurality of types of commands, when a parameter which increases in accordance with the attack action being performed reaches a predetermined amount set for each command in a state where the command is non-executable, control a state of the command such that the command is executable.

According to the configuration of the above (6), the user can be inhibited from consecutively executing the command, so that the possibility of the difficulty of the game becoming excessively low can be reduced.

(7)

In the configuration of the any one of above (1) to (6), the game program may cause the computer to, for at least one command among the plurality of types of commands, when a predetermined time set for each command elapses in a state where the command is non-executable, control a state of the command such that the command is executable.

According to the configuration of the above (7), the user can be inhibited from consecutively executing the command, so that the possibility of the difficulty of the game becoming excessively low can be reduced.

(8)

In the configuration of the any one of above (1) to (5), the game program may further cause the computer to: automatically control attack actions performed on the enemy character by the plurality of playable characters; for a command of a first group among the plurality of types of commands, when a parameter which increases in accordance with the attack action being performed reaches a predetermined amount set for each command in a state where the command is non-executable, control a state of the command such that the command is executable; for a command of a second group among the plurality of types of commands, when a predetermined time set for each command elapses in a state where the command is non-executable, control a state of the command such that the command is executable; and for a set of any one command of the first group and any one command of the second group, when a sixth operation is performed in a state where both commands in the set are executable, control an action corresponding to a combination of the set of the commands and performed by the operation target character, and control states of both commands in the set such that the commands are non-executable.

According to the configuration of the above (8), the user can perform an operation for causing the operation target character to perform actions corresponding to a combination of two commands, so that the number of options that can be taken by the user in the battle scene can be increased.

(9)

In the configuration of the any one of above (1) to (8), the game program may further cause the computer to, for at least one command among the plurality of types of commands, when a parameter which increases in accordance with another command among the plurality of types of commands being executed reaches a predetermined amount in a state where the command is non-executable, control a state of the command such that the command is executable.

According to the configuration of the above (9), the user can be inhibited from consecutively executing the command, so that the possibility of the difficulty of the game becoming excessively low can be reduced.

(10)

In the configuration of the any one of above (1) to (9), the game program may further cause the computer to: for a second special character associated with a combination of a second set including a third character and a fourth character included in the plurality of playable characters, control a state of the second special character about whether the second special character is appearable or non-appearable; and when the second special character is appearable in a state where any one of the first character, the second character, and the first special character is the operation target character, automatically perform control such that the second special character appears in the virtual space.

According to the configuration of the above (10), by causing the special character to automatically appear, a situation in the battle scene can be made more diverse, so that the strategic characteristics of the game can be improved further.

In the present specification, an information processing apparatus and an information processing system for executing the processes in the above (1) to (10) are disclosed. Moreover, in the present specification, a game processing method for executing the processes in the above (1) to (10) is disclosed.

According to the storage medium, the information processing apparatus, the information processing system, and the game processing method, many operation options can be presented to the user in the battle scene of the game.

These and other objects, features, aspects and advantages of the exemplary embodiment will become more apparent from the following detailed description when taken in conjunction with the accompanying drawings.

BRIEF DESCRIPTION I/F THE DRAWINGS

DETAILED DESCRIPTION I/F NON-LIMITING EXAMPLE EMBODIMENTS

[1. Configuration of Game System]

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
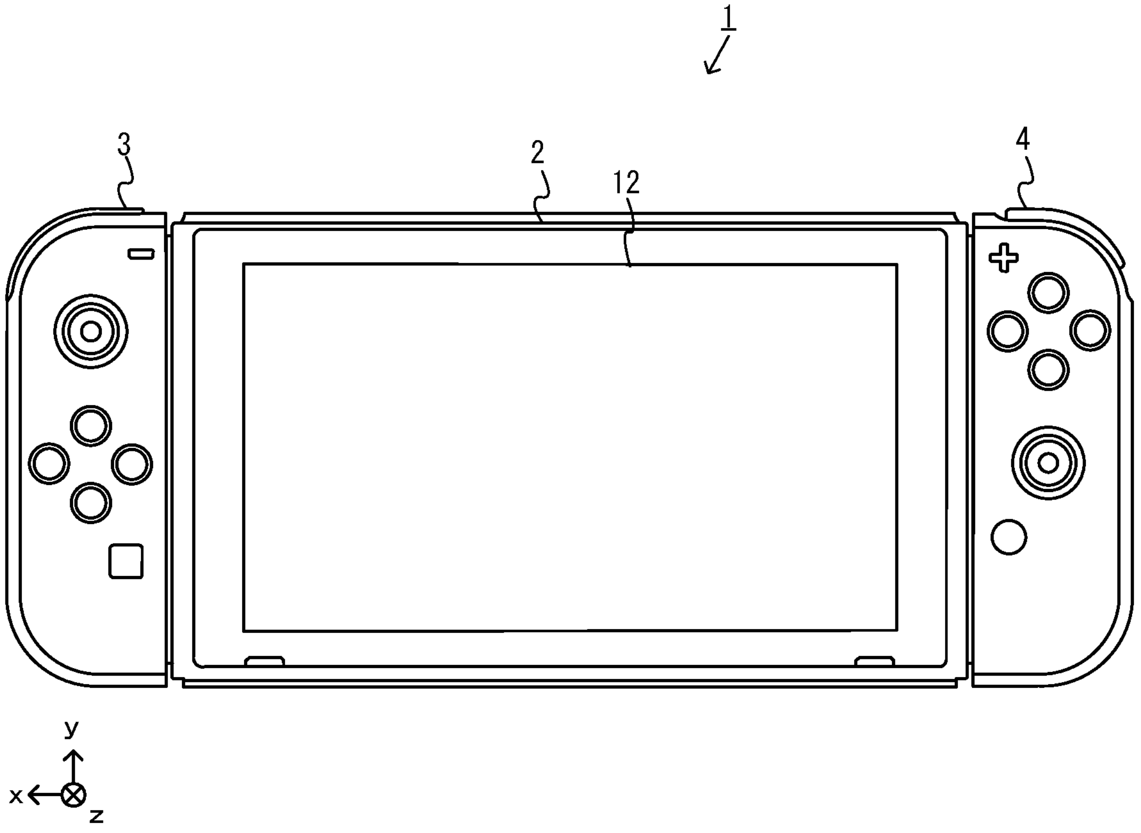
FIG. 1 is a view showing an example where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
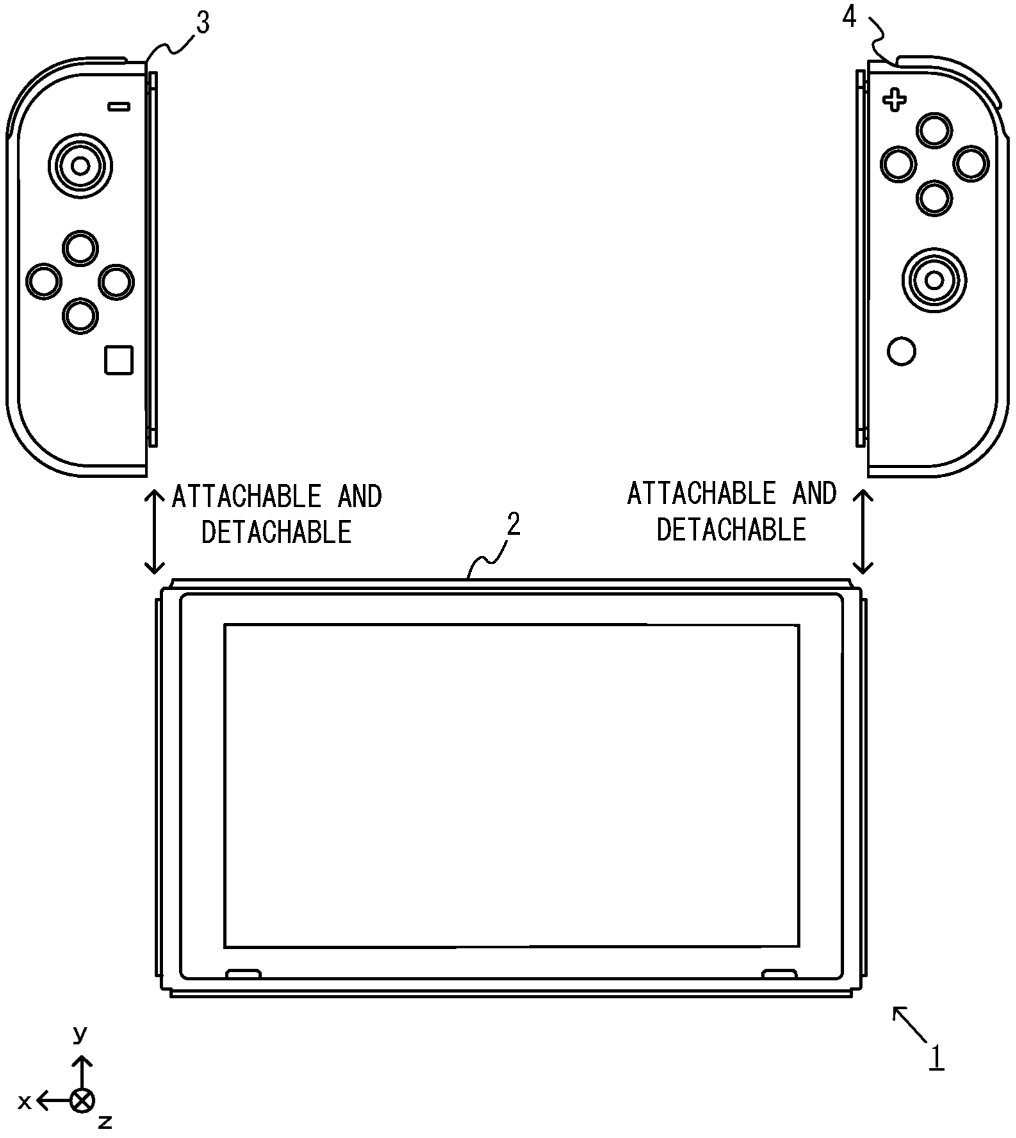
FIG. 2 is a view showing an example where a non-limiting left controller and a non-limiting right controller are removed from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
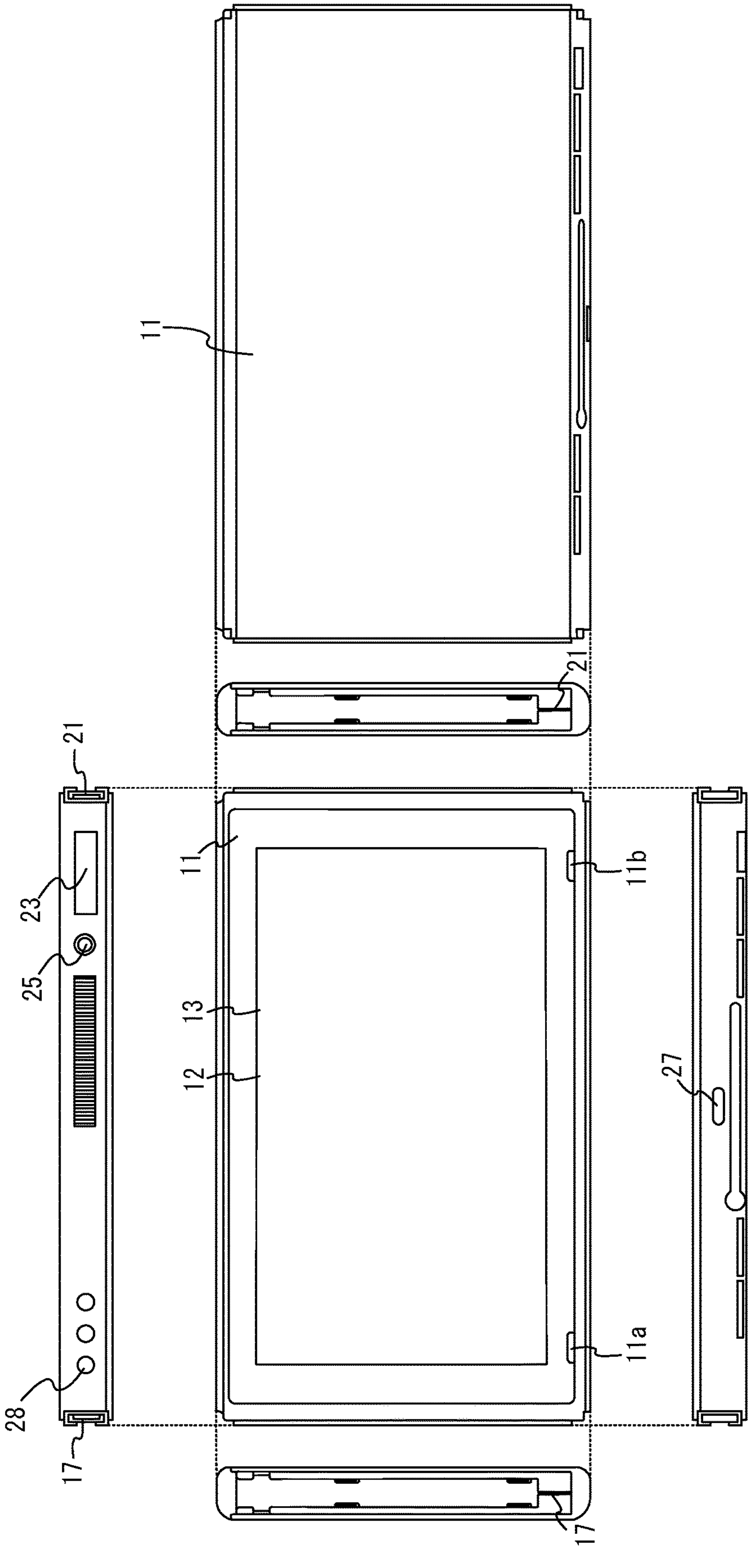
FIG. 3 is a six-sided view showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11*a* and 11*b* are formed on the main surface of the housing 11. Then, sounds output from the speakers 88 are output through the speaker holes 11*a* and 11*b*.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
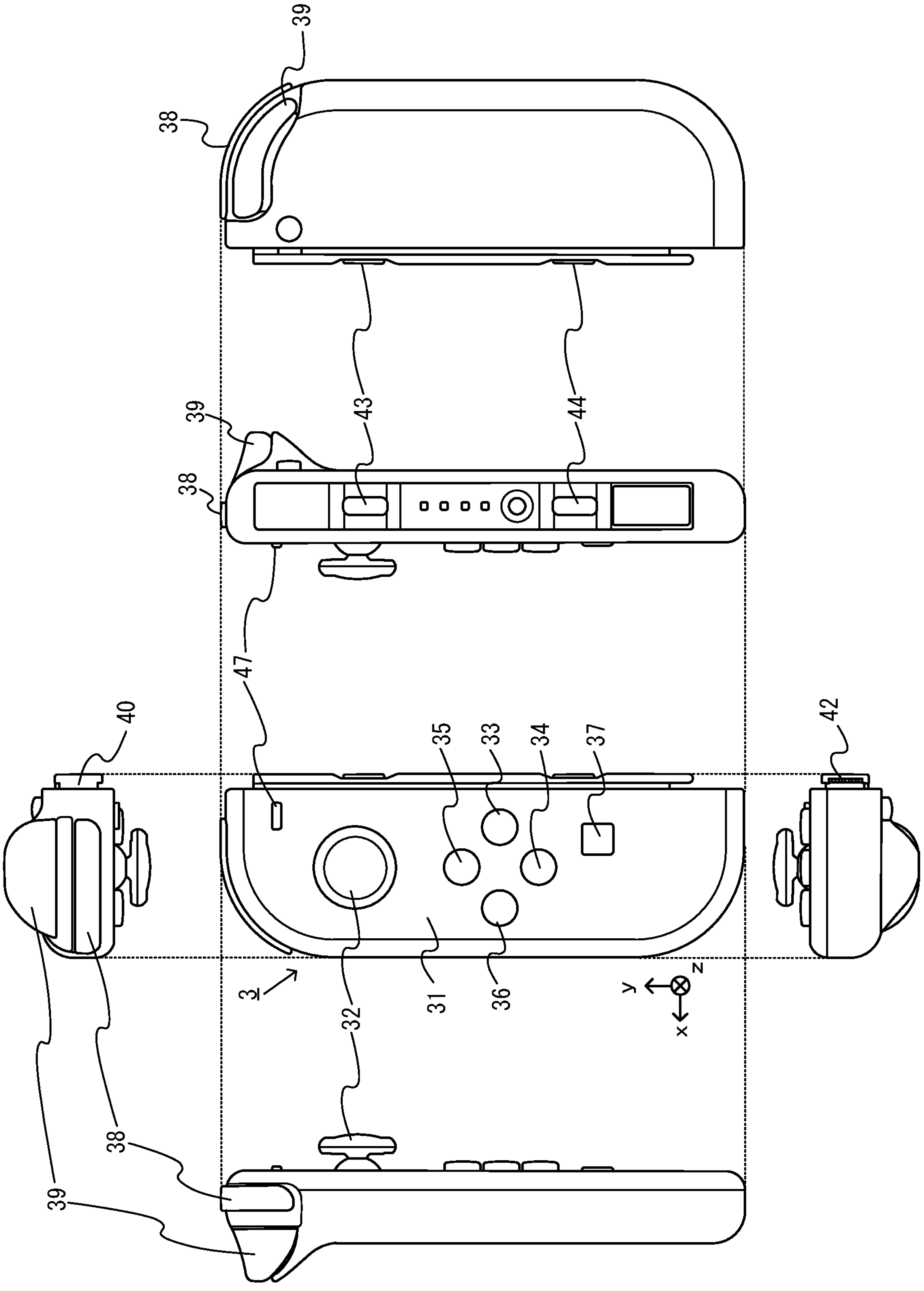
FIG. 4 is a six-sided view showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "–" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
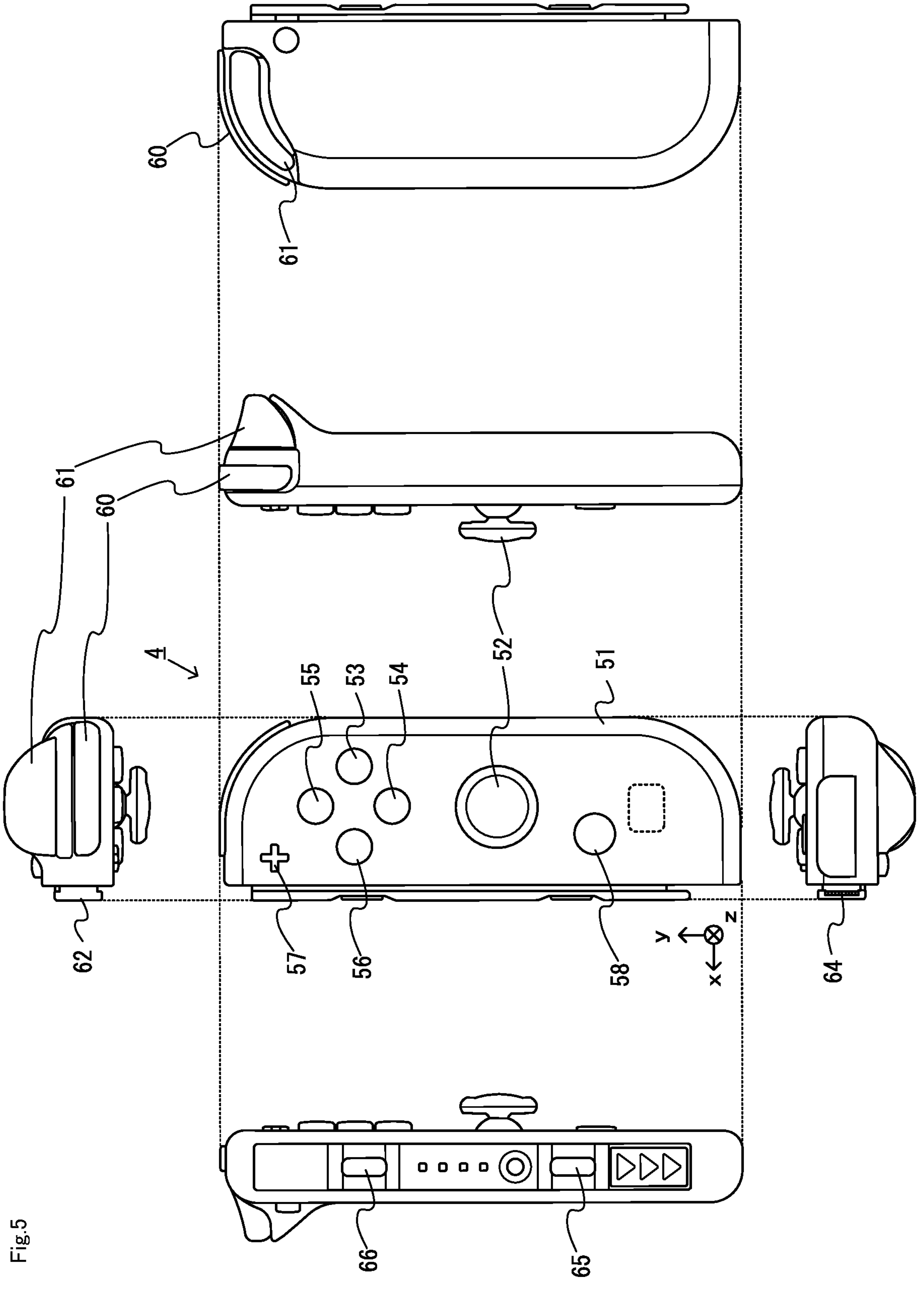
FIG. 5 is a six-sided view showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
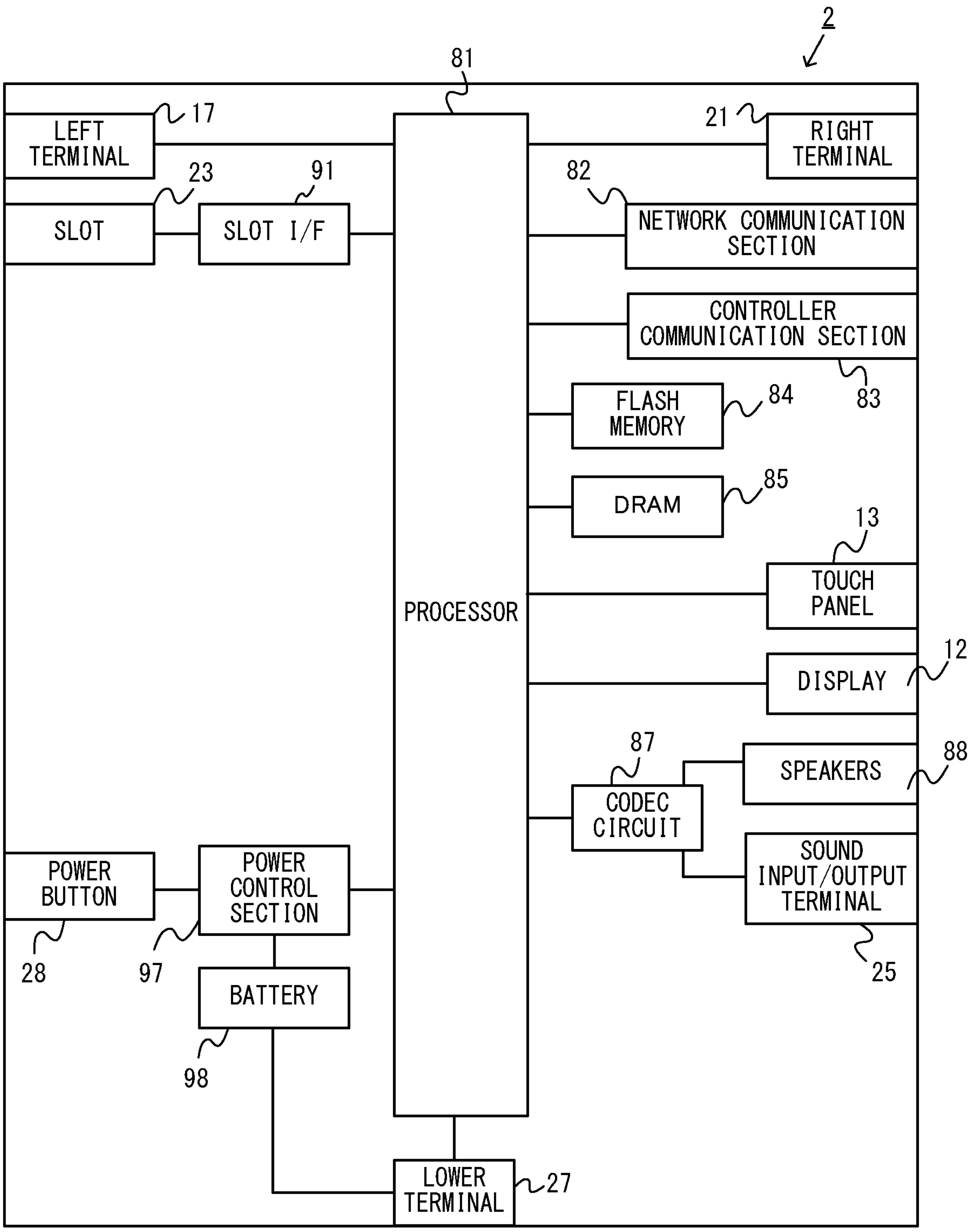
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 85, 87, 88, 91, 97, and 98 shown in FIG. 6 in addition to the components shown in FIG. 3. Some of the components 81 to 85, 87, 88, 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
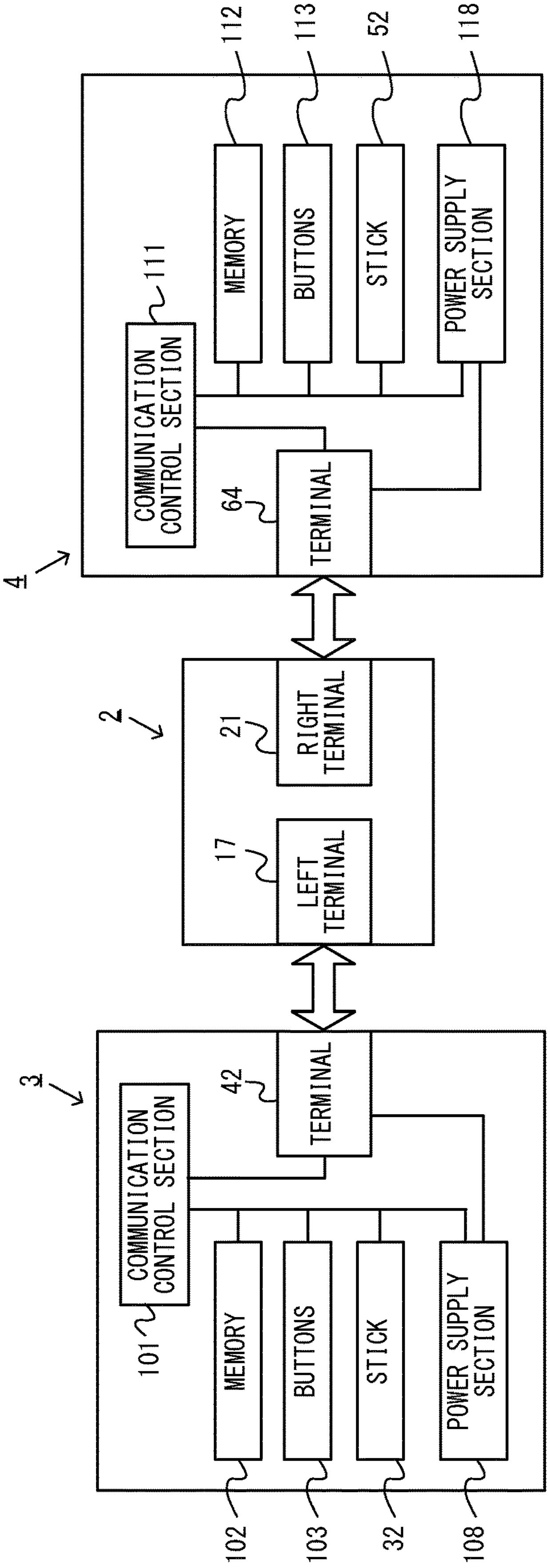
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[2. Outline of Processing on Game System]

Next, referring to FIG. 8 to FIG. 13, an outline of processing performed in the game system 1 will be described. In the exemplary embodiment, the game system 1 executes a game including a battle scene in which a plurality of characters that can be operated by a user (in other words, a player) fight against an enemy character.

Figure 8:
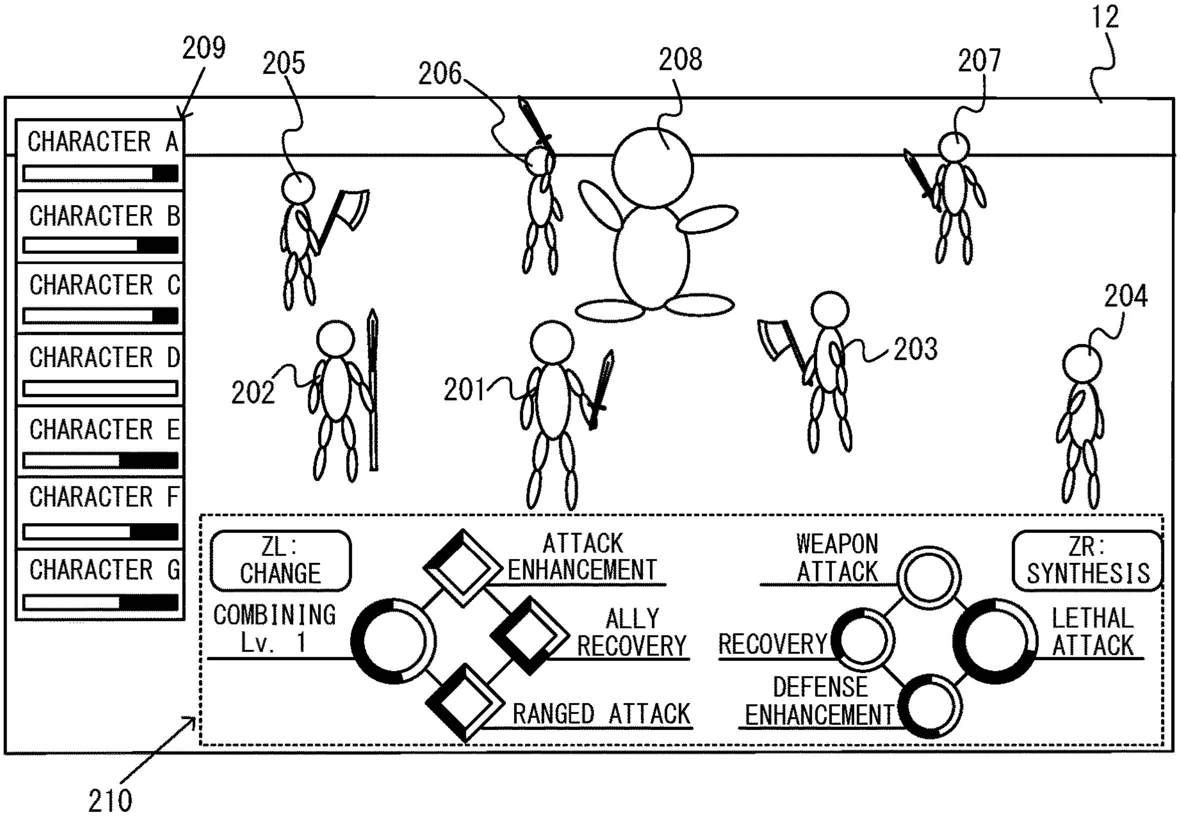
FIG. 8 is a diagram showing an example of a game image in a battle scene executed in a non-limiting game system.

FIG. 8 is a diagram showing an example of a game image in a battle scene executed in the game system 1. As shown in FIG. 8, in the exemplary embodiment, a plurality of (in this case, six) playable characters 201 to 206, a fellow character 207, and an enemy character 208 appear in a virtual game space.

A playable character is a character that can be brought into a state where the character can be operated by the user. The playable character does not have to be always operated by the user. In the exemplary embodiment, the user selects and operates one playable character from among the plurality of playable characters 201 to 206. In the following, among the playable characters, a character that is being operated by the user is referred to as an "operation target character". That is, in the exemplary embodiment, one of the plurality of playable characters becomes an operation target character. The number of playable characters may be any number that is equal to or larger than two. In addition, although described in detail later, the user can switch the character that becomes the operation target character, among the playable characters.

The user can move the operation target character in the game space through their own operation. For example, according to an operation on the analog stick 32 of the left controller 3, the operation target character moves in a direction designated through this operation. In addition, by designating a command associated with the operation target character through their own operation, the user can cause the operation target character to perform an action associated with the designated command. The specific content of the action is discretionary, and the action is, for example, an action of performing an attack, recovery, or the like. Although described in detail later, in the exemplary embodiment, the operation target character may be combined with another playable character according to an operation performed by the user.

In the exemplary embodiment, an attack (hereinafter, referred to as a "normal attack") against the enemy character 208 by the operation target character other than those by the above command is automatically controlled by the game system 1. Specifically, when the enemy character 208 is located close to the operation target character (e.g., within a predetermined distance that is set for each character), the game system 1 controls the operation target character such that the operation target character performs a normal attack against the enemy character 208. In other embodiments, the game system 1 may cause the operation target character to perform a normal attack according to an operation of the user for instructing a normal attack. Among actions that can be performed by the operation target character, there may or may not be actions that are automatically controlled by the game system 1.

The "action of the character is automatically controlled" means that the action is controlled by the game system 1 without any operation performed by the user, but means not to exclude the case where an operation performed by the user has some influence on the action of the character. For example, as for the operation target character, when the operation target character has moved to a position close to the enemy character 208 as a result of an operation performed by the user, the operation target character is controlled so as to perform a normal attack, and this control corresponds to the "action of the character is automatically controlled".

In the exemplary embodiment, the actions of the playable characters other than the operation target character are automatically controlled by the game system 1. Specifically, the game system 1 controls each playable character such that the playable character automatically performs actions that can be performed by the operation target character (specifically, movement, normal attack, action corresponding to the above command, combining). In other embodiments, the playable characters may be controlled so as to perform only some types of actions (e.g., only movement and normal attack) among the actions that can be performed by the operation target character.

The fellow character 207 is a character that is an ally of the playable characters 201 to 206 and fights against the enemy character 208 together with the playable characters 201 to 206. The number of fellow characters 207 is discretionary, and fellow characters may not necessarily appear in the battle scene. The fellow character 207 is not a playable character, and the action of the fellow character 207 is automatically controlled by the game system 1. For example, similar to the playable characters, the fellow character 207 performs actions such as movement in the game space and attack against the enemy character 208.

The enemy character 208 is a character that is an enemy of the playable characters 201 to 206 (and the fellow character 207). The action of the enemy character 208 is automatically controlled by the game system 1. For example, the enemy character 208 performs actions such as movement in the game space and attack against the playable characters 201 to 206 or the fellow character 207. The number of enemy characters 208 is discretionary, and a plurality of enemy characters may appear.

As described above, in the battle scene in the exemplary embodiment, while the respective characters 201 to 208 automatically act and a battle proceeds, the battle is progressed in real time by the user performing operations on the operation target character. Specifically, the user can cause the operation target character to perform the action corresponding to the command, and the combining, in addition to moving in the game space, through operations on the controller.

As shown in FIG. 8, the game image includes, in addition to an image representing the game space in which each character appears, a UI image related to game operations in the battle scene. Specifically, the game image includes a character state image 209 and a command UI image 210. As shown in FIG. 8, these images 209 and 210 are displayed so as to be superimposed on the image representing the game space. A dotted line shown in FIG. 8 is intended to indicate the command UI image 210, and is not actually displayed.

The character state image 209 shows the states of the playable characters 201 to 206 and the fellow character 207. Specifically, the character state image 209 includes the names (in FIG. 8, shown as "CHARACTER A", etc.) of the respective characters 201 to 207 and gauges indicating the physical strength thereof. The character state image 209 may include images of the faces of the respective characters 201 to 207, icons representing the states thereof, etc.

As described above, in the exemplary embodiment, the user can cause the operation target character to perform an action corresponding to a command. The command UI image 210 is an UI image for the user to perform an operation to designate a command to be executed for the operation target character.

Figure 9:
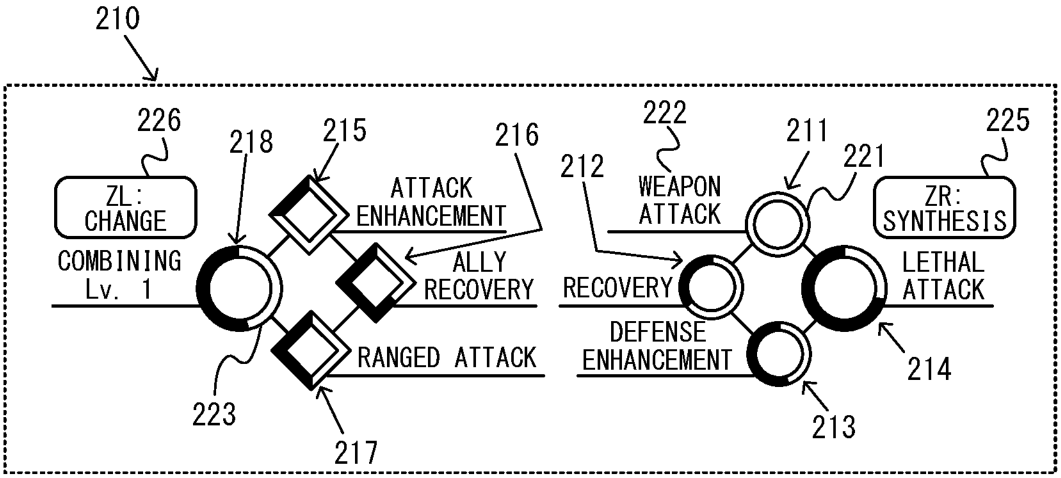
FIG. 9 is a diagram showing an example of a command UI image shown in FIG. 8.

FIG. 9 is a diagram showing an example of the command UI image 210 shown in FIG. 8. As shown in FIG. 9, the command UI image 210 includes first to seventh command instruction images 211 to 217.

Each of the command instruction images 211 to 217 indicates a command associated with the operation target character. In the exemplary embodiment, a command is an instruction that causes the operation target character to perform an action corresponding to the command. The action corresponding to the command is an action that can be performed by the operation target character in the battle scene, and is set for each playable character. For example, the above action is an attack action different from a normal attack, an action to recover oneself or an ally, an action to strengthen oneself or an ally, or the like.

Each command instruction image includes an image indicating the content of the command indicated by the command instruction image (in other words, the content of the action corresponding to the command) For example, the first command instruction image 211 includes an image 222 indicating a "weapon attack" which is the content of the action corresponding to the command (see FIG. 9). According to this, the content of the command can be notified to the user in an easy-to-understand manner through each of the command instruction images 211 to 217.

Also, as shown in FIG. 9, the command UI image 210 includes a combining instruction image 218. Although described in detail later, the combining instruction image 218 indicates a combining instruction to combine the operation target character with another playable character.

The command instruction images 211 to 217 and the combining instruction image 218 are associated with operations performed by the user (specifically, operations on the controller). When an operation is performed by the user, the game system 1 determines that the command instruction corresponding to the command instruction image associated with this operation, or the combining instruction corresponding to the combining instruction image associated with this operation has been made, and causes the operation target character to perform the action corresponding to this instruction.

Specifically, the first command instruction image 211 corresponds to the X-button 55 of the right controller 4, the second command instruction image 212 corresponds to the Y-button 56 of the right controller 4, the third command instruction image 213 corresponds to the B-button 54 of the right controller 4, and the fourth command instruction image 214 corresponds to the A-button 53 of the right controller 4. That is, the user can cause the operation target character to perform the actions of the commands corresponding to the first to fourth command instruction images 211 to 214.

Moreover, the fifth command instruction image 215 corresponds to the up direction button 35 of the left controller 3, the sixth command instruction image 216 corresponds to the right direction button 33 of the left controller 3, the seventh command instruction image 217 corresponds to the down direction button 34 of the left controller 3, and the combining instruction image 218 corresponds to the left direction button 36 of the left controller 3. That is, by pressing the buttons 33 to 36 of the left controller 3, the user can cause the operation target character to perform the actions of the commands corresponding to the fifth to seventh command instruction images 215 to 217 and combining that is the action corresponding to the combining instruction image 218, respectively.

In the exemplary embodiment, the placement on the display of the first to fourth command instruction images 211 to 214 which are placed on the right side corresponds to the placement of the buttons 53 to 56 of the right controller 4. That is, among the first to fourth command instruction images 211 to 214, the first command instruction image 211 placed on the upper side corresponds to the X-button 55 placed on the upper side among the buttons 53 to 56, the second command instruction image 212 placed on the left side corresponds to the Y-button 56 placed on the left side, the third command instruction image 213 placed on the lower side corresponds to the B-button 54 placed on the lower side, and the fourth command instruction image 214 placed on the right side corresponds to the A-button 53 placed on the right side. In addition, the placement on the display of the fifth and seventh command instruction images 215 to 217 and the combining instruction image 218 which are placed on the left side corresponds to the placement of the buttons 33 to 36 of the left controller 3. That is, among the images 215 to 218, the fifth command instruction image 215 placed on the upper side corresponds to the up direction button 35 placed on the upper side among the buttons 33 to 36, the sixth command instruction image 216 placed on the right side corresponds to the right direction button 33 placed on the right side, the seventh command instruction image 217 placed on the lower side corresponds to the down direction button 34 placed on the lower side, and the combining instruction image 218 placed on the left side corresponds to the left direction button 36 placed on the left side. By placing the images 211 to 218 as described above, the operations on the controller for making various instructions related to the command UI image 210 can be presented to the user in an easy-to-understand manner.

Each of the command instruction images 211 to 217 includes a command gauge indicating whether or not the command corresponding to the command instruction image is executable. For example, the first command instruction image 211 includes a command gauge 221 indicating whether or not a command of "weapon attack" is executable. In FIG. 9, the command gauge is an outer peripheral portion of each of the command instruction images 211 to 217 (in FIG. 9, a white portion). Although described in detail later, the command gauge increases in the clockwise direction according to the progress of the game in the battle scene, and becomes accumulated when reaching a length equal to the perimeter of the instruction image. In the example shown in FIG. 9, the command gauge 221 of the first command instruction image 211 is accumulated, and the command gauges of the other command instruction images 212 to 217 are not accumulated.

In the exemplary embodiment, the command indicated by each of the command instruction images 211 to 217 becomes executable on the condition that the command gauge becomes accumulated. That is, in a state where the command gauge is not accumulated, even when the user performs the operation corresponding to the command instruction image, the game system 1 does not allow the operation target character to perform the action of the command corresponding to the command instruction image.

When the operation corresponding to a command instruction image in which the command gauge is accumulated is performed by the user, the game system 1 causes the operation target character to perform the action of the command corresponding to the command instruction image. In this case, the game system 1 returns the length of the command gauge to 0. As a result, the command corresponding to the command instruction image cannot be executed for a while until the command gauge becomes accumulated.

Although not shown, the game system 1 may make the display form of each command instruction image different between when the command gauge is accumulated and when the command gauge is not accumulated. For example, in a state where the command gauge is accumulated, the command instruction image may be displayed brighter than in a state where the command gauge is not accumulated. Accordingly, whether or not the command gauge is accumulated can be notified to the user in an easy-to-understand manner.

In the exemplary embodiment, the commands related to the playable characters are classified into three groups having different methods for increasing the command gauge. A first group is a type of commands for which the command gauge is increased by the playable character performing a normal attack. A second group is a type of commands for which the command gauge is increased according to the passage of time in the battle scene. A third group is a type of commands for which the command gauge is increased by executing the command of the first or second group.

The degree of increase of the command gauge in each command instruction image may be set for each command. For example, the respective command gauges of the first to third command instruction images 211 to 213 corresponding to the commands included in the first group may be controlled so as to be increased at different speeds.

As described above, in the exemplary embodiment, the game system 1 automatically controls attack actions (specifically, actions of normal attacks) performed on the enemy character by the plurality of playable characters. As for each of at least some commands (specifically, the commands of the first group) among the plurality of types of commands, in a state where the command is not executable, when a parameter that increases in accordance with an attack action being performed (i.e., a parameter indicating the length of the command gauge) reaches a predetermined amount (i.e., the upper limit of the command gauge, more specifically, a length equal to the perimeter of the command instruction image) set for each command, the game system 1 controls the state of the command such that the command is executable. According to this, the user can be inhibited from consecutively executing the command, so that, for example, the possibility of the difficulty of the battle becoming excessively low by consecutively executing a powerful command can be reduced. Accordingly, the strategic characteristics of the game can be improved.

In the exemplary embodiment, as for each of at least some commands (specifically, the commands of the second group) among the plurality of types of commands, in a state where the command is not executable, when a predetermined time (i.e., the time until the command gauge reaches the upper limit) set for each command elapses, the game system 1 controls the state of the command such that the command is executable. According to this as well, the game system 1 can inhibit the user from consecutively executing the command, so that the possibility of the difficulty of the battle becoming excessively low can be reduced.

In the exemplary embodiment, as for each of at least some commands (specifically, the commands of the third group) among the plurality of types of commands, in a state where the command is not executable, when a parameter that increases according to another command (specifically, a command of the first or second group) among the plurality of types of commands (i.e., a parameter indicating the length of the command gauge) reaches a predetermined amount (i.e., the upper limit of the command gauge, more specifically, a length equal to the perimeter of the command instruction image), the game system 1 controls the state of the command such that the command is executable. According to this as well, the game system 1 can inhibit the user from consecutively executing the command, so that the possibility of the difficulty of the game becoming excessively low can be reduced.

In other embodiments, the command gauge may be increased by a method other than those described above. For example, in other embodiments, the game system 1 may increase or decrease a combining command gauge in accordance with use of an item by a playable character, etc. In addition, in other embodiments, the state of whether or not the command is executable may be managed by a method different from those for the command gauges.

In the example shown in FIG. 9, the commands indicated by the first to third command instruction images 211 to 213 are the commands of the first group, and the commands indicated by the fifth to seventh command instruction images 215 to 217 are the commands of the second group. That is, the command gauges of the first to third command instruction images 211 to 213 gradually increase according to the passage of time, and the command gauges of the fifth to seventh command instruction images 215 to 217 increase in accordance with the operation target character performing a normal attack. In addition, the command indicated by the fourth command instruction image 214 is the command of the third group. That is, the command gauge of the fourth command instruction image 214 increases in accordance with the commands indicated by the first to third command instruction images 211 to 213 or the fifth to seventh command instruction images 215 to 217 being executed.

Here, in the example shown in FIG. 9, the shapes of the first to third command instruction images 211 to 213 are circular, whereas the shapes of the fifth to seventh command instruction images 215 to 217 are quadrangular. In addition, the fourth command instruction image 214 is slightly larger than the first to third command instruction images 211 to 213. As described above, in the exemplary embodiment, the display forms (specifically, shape and size, but may be color and pattern) of the command instruction images of the different groups of commands are made different from each other. Accordingly, which group the command belongs to can be notified to the user in an easy-to-understand manner.

In the exemplary embodiment, the correspondence relationships between the command instruction images 211 to 217 and the commands indicated by the command instruction images 211 to 217 can be changed by instructions of the user during the game (e.g., in a setting mode which is not the battle scene, etc.). For example, the game system 1 may be able to optionally assign the commands of the first group among the commands corresponding to the actions that are executable by the playable characters, to the first to third command instruction images 211 to 213 according to instructions of the user. Similarly, the game system 1 may be able to optionally assign the command of the third group among the commands corresponding to the actions that are executable by the playable characters, to the fourth command instruction image 214 according to an instruction of the user. In addition, the game system 1 may be able to optionally assign the commands of the second group among the commands corresponding to the actions that are executable by the playable characters, to the fifth to seventh command instruction images 215 to 217 according to instructions of the user.

In the exemplary embodiment, depending on the type of the playable character, the commands indicated by the first to third command instruction images placed on the right side may be the commands of the second group, and the commands indicated by the fifth to seventh command instruction images placed on the left side may be the commands of the first group. In this case, the shapes of the first to third command instruction images are quadrangular, and the shapes of the fifth to seventh command instruction images are circular.

For example, in the exemplary embodiment, a first type of playable characters originally learn the actions corresponding to the commands of the first group, and learn the actions corresponding to the commands of the second group according to the progress of the game, whereas a second type of playable characters originally learn the actions corresponding to the commands of the second group, and learn the actions corresponding to the commands of the first group according to the progress of the game. In this case, for the first type of playable characters, as shown in FIG. 9, the first to third command instruction images 211 to 213 indicating the commands of the first group and the fifth to seventh command instruction images 215 to 217 indicating the commands of the second group are displayed. Meanwhile, for the second type of playable characters, unlike FIG. 9, the first to third command instruction images 211 to 213 indicating the commands of the second group and the fifth to seventh command instruction images 215 to 217 indicating the commands of the first group may be displayed.

Also, as shown in FIG. 9, the command UI image 210 includes a synthesis instruction image 225. The synthesis instruction image 225 indicates an instruction to perform command synthesis (synthesis instruction). In the exemplary embodiment, the command synthesis instruction is made by an operation of pressing the ZR-button 61 of the right controller 4. Therefore, the synthesis instruction image 225 includes letters "ZR: SYNTHESIS". In addition, in order to represent the positional relationship between each of the buttons 53 to 56 and the ZR-button 61 on the right controller 4, the synthesis instruction image 225 is placed on the upper right side of the first to fourth command instruction images 211 to 214. Accordingly, the operation on the controller for making the synthesis instruction can be notified to the user in an easy-to-understand manner.

Here, command synthesis in the exemplary embodiment refers to bringing synthesized two commands into a state where the two commands can be executed at one time. In other embodiments, by command synthesis, the effect of the action corresponding to each command before synthesis (e.g., the effect of attack or the effect of recovery) may be able to be increased, or an effect different from the effect of the action corresponding to each command before synthesis may be able to be generated.

In the exemplary embodiment, a command of the first group and a command of the second group corresponding to this command can be synthesized under a certain condition.

Two commands corresponding to each other in two groups are commands placed at the same position in the up-down direction in the command UI image 210. Specifically, the command indicated by the first command instruction image 211 corresponds to the command indicated by the fifth command instruction image 215, the command indicated by the second command instruction image 212 corresponds to the command indicated by the sixth command instruction image 216, and the command indicated by the third command instruction image 213 corresponds to the command indicated by the seventh command instruction image 217. As described above, in the exemplary embodiment, the correspondence relationship between each command instruction image and the command corresponding thereto can be changed, so that the user can also change a set of two commands to be synthesized, by changing this correspondence relationship.

In the exemplary embodiment, in a state where both of two commands to be synthesized are executable (i.e., a state where the command gauges of the two commands are accumulated), it is possible to synthesize the two commands. The game system 1 may make the display form of the synthesis instruction image 225 different between a state where there is a set of two commands that can be synthesized and a state where there is not such a set. For example, in the former state, the game system 1 may display the synthesis instruction image 225 brighter than in the latter state.

In a state where there is a set of two commands that can be synthesized, when the user makes the above synthesis instruction (i.e., performs an operation of pressing the ZR-button 61), the game system 1 performs synthesis of the two commands.

Figure 10:
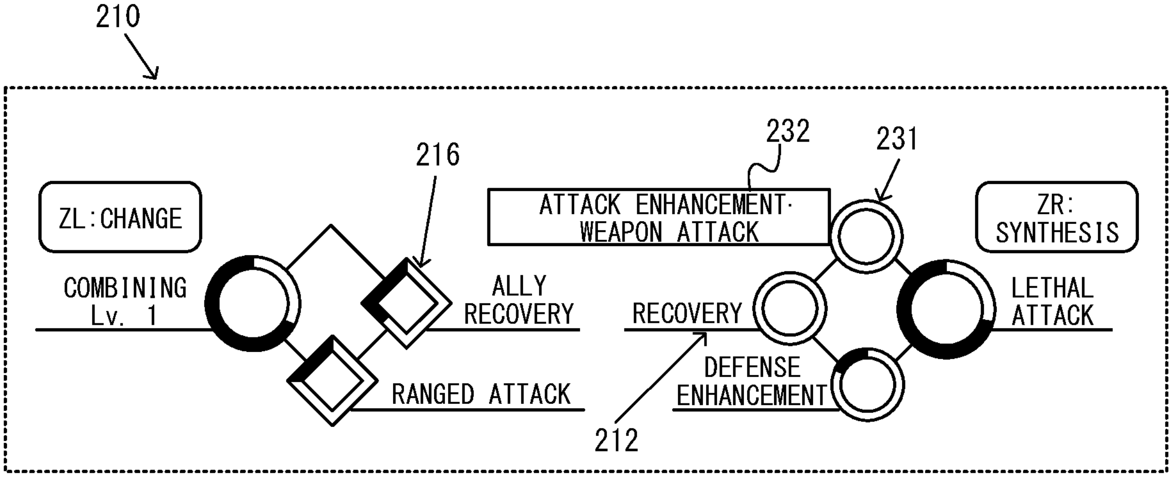
FIG. 10 is a diagram showing an example of the command UI image in the case where command synthesis is performed.

FIG. 10 is a diagram showing an example of the command UI image 210 in the case where command synthesis is performed. In the exemplary embodiment, when command synthesis is performed, two command instruction images corresponding to synthesized two commands are integrated (also referred to as unified). In the exemplary embodiment, while the synthesis instruction is being made (i.e., an operation of pressing the ZR-button 61 is being performed), the command instruction images are integrated, and when the synthesis instruction is cancelled (i.e., the operation of pressing the ZR-button 61 is ended), the integration of the command instruction images is cancelled, and the original command UI image is displayed.

In the example shown in FIG. 10, the first command instruction image 211 and the fifth command instruction image 215 shown in FIG. 9 are integrated into one first command instruction image 231. The second command instruction image 212 is in a state where the command gauge thereof is accumulated, but the sixth command instruction image 216 corresponding to the second command instruction image 212 is in a state where the command gauge thereof is not accumulated. Therefore, synthesis of the commands corresponding to these two images is not performed, and the command instruction images 212 and 216 are not integrated. Although not shown, if the second command instruction image 212 and the sixth command instruction image 216 are both in a state where the command gauge thereof is accumulated in FIG. 10, the command instruction images 212 and 216 are integrated in the same manner as for the first command instruction image 231. Owing to the above, the fact that the two commands have been synthesized and which set of commands have been synthesized can be notified to the user in an easy-to-understand manner.

The first command instruction image 231 after synthesis includes an image 232 indicating the contents of the synthesized two commands (in the example shown in FIG. 10, "ATTACK ENHANCEMENT·WEAPON ATTACK"). Accordingly, the contents of the synthesized two commands can be notified to the user in an easy-to-understand manner.

In a state where commands have been synthesized as described above, by performing an operation corresponding to the command instruction image after synthesis (in FIG. 10, the first command instruction image 231), the user can cause the operation target character to perform the respective actions corresponding to the synthesized two commands, at one time. In the example shown in FIG. 10, by pressing the X-button 55 of the right controller 4, the user can cause the operation target character to perform the respective actions of "attack enhancement" and "weapon attack" corresponding to the two commands. In the exemplary embodiment, even in a state where commands have been synthesized, similar to before synthesis, the command instruction image after synthesis is placed so as to indicate an operation for executing the synthesized two commands (specifically, indicate the placement of a button for performing this operation). Accordingly, the operation for executing the synthesized two commands can be notified to the user in an easy-to-understand manner.

In a state where commands have been synthesized as described above, either one of the command instruction images corresponding to the synthesized two commands (in the example shown in FIG. 10, the first command instruction image 231) is displayed, and the other thereof (in the example shown in FIG. 10, the fifth command instruction image 215 displayed in FIG. 9) is not displayed. Accordingly, in the above state, the user can be notified in an easy-to-understand manner that an instruction to execute the commands is performed by an operation corresponding to the one command instruction image displayed.

In the exemplary embodiment, the game system 1 counts the number of times execution of the respective commands synthesized is performed (referred to as number of times of synthesized command execution) for each combined character corresponding to the operation target character (the combined character will be described in detail later). In the exemplary embodiment, according to the number of times of synthesized command execution for the operation target character, the game system 1 increases a combining level of the combined character corresponding to the operation target character. For example, the game system 1 increases the combining level by 1 in accordance with the number of times of synthesized command execution reaching a predetermined number of times. The number of times for increasing the combining level to the next level may be set to a different value depending on the combining level. The combining of the operation target character and the combining level will be described later.

As described above, in the exemplary embodiment, as for a set of any command of the first group and any command of the second group, in a state where both commands in the set are executable, when a predetermined operation (specifically, a combination of the operation for the synthesis instruction and the operation for executing the synthesized commands) is performed, the game system 1 controls the actions corresponding to a combination of the commands in the set and performed by the operation target character. In addition, the game system 1 controls the states of the commands in the set such that both commands are not executable. That is, the game system 1 sets the length of each of the command gauges of the command instruction images corresponding to the commands in the set to 0. According to the above, the user can perform an operation for causing the operation target character to perform actions corresponding to a combination of two commands. Accordingly, the number of options that can be taken by the user in the battle scene can be increased. In addition, according to the above, the user can be allowed to perform an operation for executing two commands at one time. In other embodiments, the game system 1 may not necessarily have the function to synthesize commands.

Also, as shown in FIG. 9, the command UI image 210 includes a change instruction image 226. The change instruction image 226 indicates an instruction to change the command instruction image (change instruction). In the exemplary embodiment, the change instruction is made by an operation of pressing the ZL-button 39 of the left controller 3. Therefore, the change instruction image 226 includes letters "ZL: CHANGE". In addition, in order to represent the positional relationship between each of the buttons 33 to 36 and the ZL-button 39 in the left controller 3, the change instruction image 226 is placed on the upper left side of the instruction images 215 to 218. Accordingly, the operation on the controller for making the change instruction can be notified to the user in an easy-to-understand manner.

In the exemplary embodiment, while the change instruction is being made (i.e., an operation of pressing the ZL-button 39 is being performed), the game system 1 accepts a character switching instruction to switch the operation target character. For example, the character switching instruction is made with the first L-button 38 of the left controller 3 and the first R-button 60 of the right controller 4 while the change instruction is being made. Specifically, each time the first L-button 38 is operated, the character that becomes the operation target character is switched among the playable characters in a predetermined switching order, and each time the first R-button 60 is operated, the character that becomes the operation target character is switched among the playable characters in an order opposite to the switching order.

In the exemplary embodiment, when the operation target character is switched, the game system 1 sets the position and the direction of a virtual camera for generating a game image, based on the new operation target character. Specifically, in the above case, the position and the direction of the virtual camera are set such that the new operation target character is displayed around the center of the screen. Accordingly, the user can easily recognize that the operation target character has been changed, and can easily recognize the operation target character after change. In addition, in the exemplary embodiment, in the battle scene, the game system 1 changes the position and the direction of the virtual camera according to an operation of the user (e.g., an operation on the analog stick 52 of the right controller 4). Thus, the user can control the position and the direction of the virtual camera in the battle scene.

Figure 11:
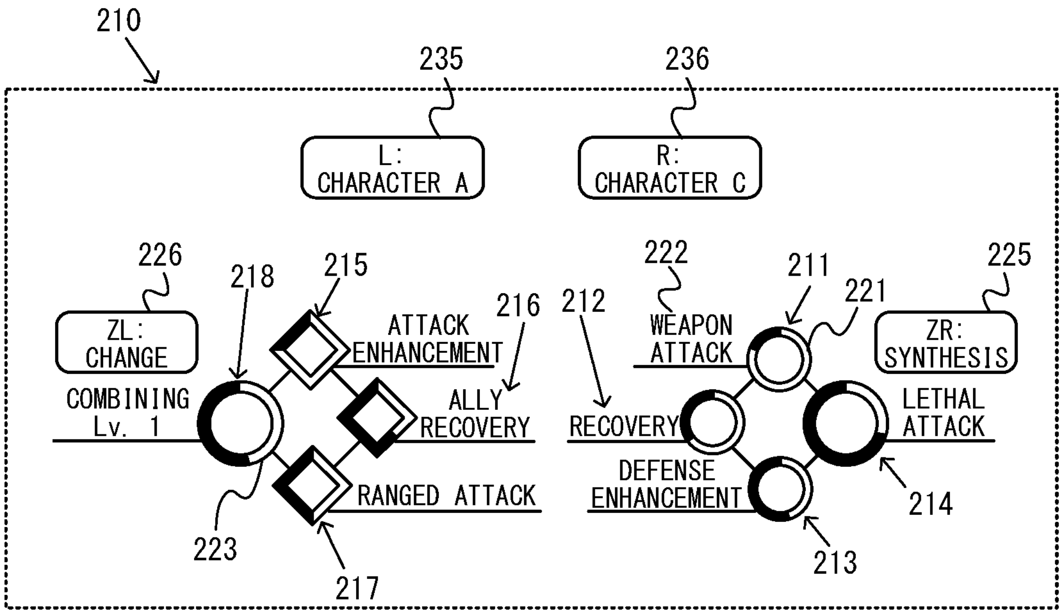
FIG. 11 is a diagram showing an example of the command UI image while a change instruction is being made.

FIG. 11 is a diagram showing an example of the command UI image 210 while the change instruction is being made. As shown in FIG. 11, while the change instruction is being made, the game system 1 changes the command UI image 210 such that character switching instruction images 235 and 236 indicating the character switching instruction are included therein. The character switching instruction image 235 indicates the first L-button 38 and the name (in FIG. 11, "CHARACTER A") of the operation target character, after switching, to which switching is performed when the first L-button 38 is operated. In addition, the character switching instruction image 236 indicates the first R-button 60 and the name (in FIG. 11, "CHARACTER C") of the operation target character, after switching, to which switching is performed when the first R-button 60 is operated. In the example shown in FIG. 11, the command UI image 210 when the operation target character is a "character B" is shown. According to the above, the operation for the character switching instruction and the operation target character after the operation can be notified to the user in an easy-to-understand manner.

In the exemplary embodiment, while the change instruction is not made, the game system 1 switches the enemy character to be attacked by the operation target character, according to an operation on the first L-button 38 or the first R-button 60. According to this, the user can make more instructions using the first L-button 38 and the first R-button 60, so that the operability of the game can be improved.

Next, combining of playable characters will be described. In the exemplary embodiment, when a combining condition is satisfied, the operation target character can be combined with another playable character in response to a combining instruction made by the user (specifically, an operation of pressing the left direction button 36 of the left controller 3, indicated by the combining instruction image 218). In the exemplary embodiment, for each of the six playable characters, one other playable character that can be combined is determined in advance. Specifically, sets of two playable characters that can be combined are a set of the character A and the character B, a set of the character C and a character D, and a set of a character E and a character F. In other embodiments, other playable characters that can be combined with one playable character may be a plurality of types of playable characters. In addition, in other embodiments, three or more playable characters may be combined.

Figure 12:
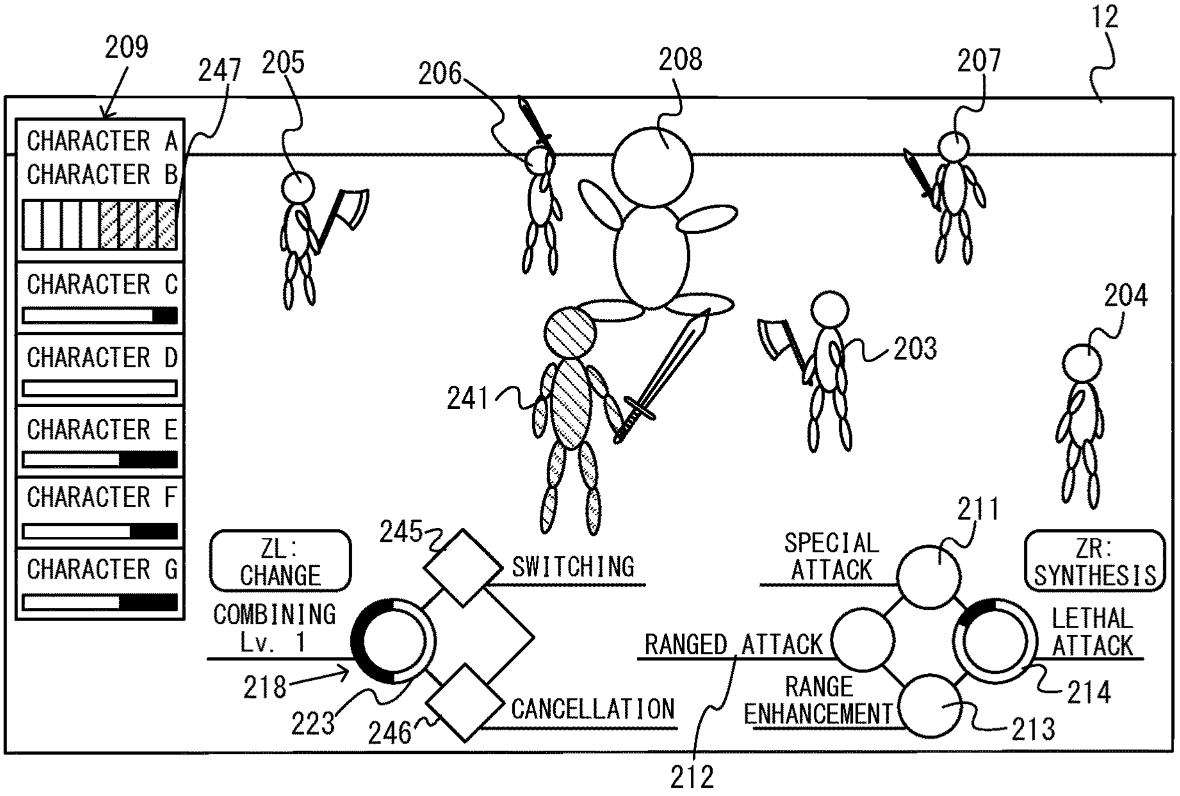
FIG. 12 is a diagram showing an example of a game image when combining of an operation target character is performed.

FIG. 12 is a diagram showing an example of the game image when combining of the operation target character is performed. The example shown in FIG. 12 is an example of a state where the character A (the playable character 201 shown in FIG. 8) which is the operation target character in the state shown in FIG. 8 and the character B (the playable character 202 shown in FIG. 8) which can be combined with the character A are combined. In the exemplary embodiment, as shown in FIG. 12, when the two playable characters 201 and 202 are combined, the two playable characters 201 and 202 leave the game space (in other words, are deleted), and one combined character 241 appears instead of the two playable characters 201 and 202 (in the drawing, the combined character 241 is indicated by hatching). The combined character is a character that can be operated by the user, and can be said to be a playable character. However, in the present specification, a character after combining is referred to as a "combined character" to distinguish this character from the playable characters before combining.

In the exemplary embodiment, when combining of the operation target character is performed, the game system 1 sets a combined character as a new operation target character. According to this, the user does not have to newly designate an operation target character, so that the convenience of the user can be improved.

In the exemplary embodiment, the combined character appearing as a result of combining is set to have an ability corresponding to a combining level at the time of combining (specifically, a combining level set for the original playable character for combining). For example, the ability of the combined character is set so as to be higher as the combining level is higher. As described above, the user can increase the combining level by executing the synthesized commands. As described above, in the exemplary embodiment, the strategic characteristics of the game can be improved by changing the ability of the combined character in accordance with execution of the synthesized commands.

When the combined character is the operation target character, a command UI image corresponding to the combined character is displayed (see FIG. 12). In the command UI image for the combined character, the first to fourth command instruction images 211 to 214 have contents indicating commands associated with the combined character. For example, the first command instruction image 211 shown in FIG. 12 indicates a command of "special attack" and is changed from the content of the command in FIG. 8 ("weapon attack").

In the exemplary embodiment, as for the combined character, the commands other than the command of the third group are executable at any timing. Therefore, in the command instruction images 211 to 213 related to the combined character, no command gauge is displayed (in order to notify the user that the command is executable, a command gauge may be constantly displayed in a state where the command gauge is accumulated). As described above, in the exemplary embodiment, as for the combined character, the commands are executable without waiting for the command gauges to become accumulated, so that a situation in which the combined character has appeared can be said to be advantageous to the user.

In the exemplary embodiment, as for the combined character, the executable commands are indicated by the first to fourth command instruction images 211 to 214, and the fifth to seventh command instruction images 215 to 217 are not displayed. The command UI image for the combined character includes a command switching instruction image 245 and a cancellation instruction image 246 instead of the fifth to seventh command instruction images 215 to 217 (see FIG. 12).

The command switching instruction image 245 indicates a command switching instruction to switch the command for the combined character. Here, in the exemplary embodiment, the combined character can be brought into two states, that is, a state where one of the two original playable characters is a primary character and a state where the other of the original playable characters is a primary character Immediately after combining, the combined character is brought into a state where the playable character that is the operation target character immediately before combining is a primary character. For the combined character, a pattern of executable commands (specifically, a pattern of the commands indicated by the first to fourth command instruction images 211 to 214) is switched depending on which of the two states the combined character is in. That is, in accordance with the command switching instruction being made, the game system 1 switches the state of the combined character, and switches the pattern of executable commands Specifically, in accordance with the pattern of executable commands being switched, the game system 1 switches the contents of the commands indicated by the first to fourth command instruction images 211 to 214. The appearance of the combined character may be changed according to the above state switching.

In the exemplary embodiment, the command switching instruction is made by an operation on the up direction button 35 of the left controller 3. Therefore, the command switching instruction image 245 is placed at the same position as the above-described fifth command instruction image 215. Accordingly, the operation on the controller for making the command switching instruction can be notified to the user in an easy-to-understand manner.

As described above, in the exemplary embodiment, a first command pattern corresponding to a first character before combining and a second command pattern corresponding to a second character before combining are associated with the combined character. In a state where the combined character is the operation target character, when a predetermined operation (specifically, the operation for the command switching instruction) is performed, the game system 1 changes the pattern of commands to be used for the combined character, from the first command pattern to the second command pattern or from the second command pattern to the first command pattern. Accordingly, the user can execute many commands for the combined character, so that more options can be presented to the user in the battle scene.

Each of the first and second command patterns corresponds to at least any of the operations for the commands indicated by the command instruction images 211 to 217 before combining (in the exemplary embodiment, the operations corresponding to the first to fourth command instruction images 211 to 214). That is, the operations for executing the commands before combining and the operations for executing the commands after combining overlap at least partially. Therefore, the user can designate and execute a command before combining and a command after combining, by the same operation (specifically, an operation of pressing the same button). Accordingly, the operability of the operation for designating a command to be executed can be improved.

The cancellation instruction image 246 indicates a cancellation instruction to cancel the combining into the combined character. In accordance with the cancellation instruction being made, the game system 1 causes the combined character to leave the game space, and causes the two original playable characters to appear in the game space. In the exemplary embodiment, the cancellation instruction is made by an operation on the down direction button 34 of the left controller 3. Therefore, the cancellation instruction image 246 is placed at the same position as the above-described seventh command instruction image 217. Accordingly, the operation on the controller for making the cancellation instruction can be notified to the user in an easy-to-understand manner.

In the exemplary embodiment, the game system 1 controls whether a combined character (in other words, the original playable characters for the combined character) is in a combinable state or a non-combinable state. The above-described combining condition for the combined character to be combinable is that the combined character is in a combinable state. Here, as shown in FIG. 9 and FIG. 12, the combining instruction image 218 includes a combining state gauge 223 indicating a state related to combining of the operation target character. In the exemplary embodiment, the combinable state of the combined character is managed by the combining state gauge 223.

In the exemplary embodiment, while combining is being performed, the combining state gauge 223 increases under a certain condition (which will be described in detail later). When the combining state gauge 223 becomes accumulated to the upper limit, the game system 1 cancels the combining into the combined character. At this time, similar to the case where the cancellation instruction is made, the game system 1 causes the combined character to leave the game space, and causes the two original playable characters to appear in the game space. In addition, when the combining state gauge 223 becomes accumulated to the upper limit, unlike the case where the cancellation instruction is made, the game system 1 brings the two original playable characters for the combined character into a non-combinable state.

When the playable characters are in a non-combinable state, the game system 1 may change the combining instruction image 218 to be in a display form indicating that the playable characters are in a non-combinable state. For example, the combining instruction image 218 may be changed so as to include a message "Combining is not possible". Accordingly, the user can be notified in an easy-to-understand manner that the playable characters are in a non-combinable state.

Meanwhile, while combining into a combined character is not performed, the combining state gauge 223 for the playable characters corresponding to the combined character decreases according to the passage of time. When the combining state gauge 223 becomes accumulated to the upper limit and the playable characters are in a non-combinable state, the playable characters are brought into a combinable state in accordance with the length of the combining state gauge 223 reaching 0 due to the passage of time later.

As described above, in the exemplary embodiment, in a state where the combined character is non-appearable (i.e., non-combinable), when a predetermined condition including the passage of time is satisfied (specifically, when the combining state gauge reaches 0 according to the passage of time), the game system 1 controls the state of the combined character such that the combined character is appearable. Accordingly, it is made possible to perform combining a plurality of times in the battle scene, and it is also possible to reduce the risk of the difficulty of the game becoming excessively low.

In the exemplary embodiment, the above predetermined condition is that the combining state gauge which decreases according to the passage of time reaches 0. However, the predetermined condition may include conditions other than the above. For example, in other embodiments, it may be possible to change from a non-combinable state to a combinable state by using a specific item or executing a specific command. In addition, in other embodiments, a combined character that is brought into a non-combinable state in one battle scene may be controlled not to be brought into a combinable state again.

When the combining is canceled in response to the above combining instruction, since the combining state gauge 223 has not been accumulated to the upper limit, the combinable state of the playable characters is maintained even immediately after the combining is canceled. Therefore, in this case, the user can perform combining again immediately after the cancellation of the combining. In the above case, the length of the combining state gauge 223 is maintained, and decreases according to the passage of time after the cancellation of the combining. Therefore, when combining is performed again immediately after the cancellation of the combining, since the combining state gauge 223 has been accumulated to some extent, the time for which the combining can be continued may be shortened.

In the exemplary embodiment, while combining is being performed, the combining state gauge 223 increases according to the passage of time. Therefore, in the exemplary embodiment, the remaining length to the upper limit in the combining state gauge 223 can be said to indicate the remaining time of the combining. As described later, the remaining time of the combining is also decreased by other factors other than the passage of time. Therefore, more precisely, the remaining length to the upper limit in the combining state gauge 223 indicates the remaining time of the combining in the case where the other factors do not occur.

Due to the above, in the exemplary embodiment, as information indicating a state about whether each combined character is appearable or non-appearable, the game system 1 stores information including at least information indicating whether the combined character is appearable or non-appearable and information regarding a remaining appearable time (specifically, information from which the remaining length to the upper limit in the combining state gauge 223 can be identified). In a state where the combined character has appeared, the game system 1 decreases the remaining appearable time at least according to the passage of time, and when the remaining appearable time runs out, the game system 1 changes the state of the combined character such that the combined character is non-appearable, and performs control such that the combined character leaves the virtual space. In addition, in a state where the remaining appearable time remains, when a predetermined operation (specifically, the operation for the cancellation instruction) is performed, the game system 1 performs control such that the combined character leaves the virtual space while keeping the state of the combined character as a state where the combined character is appearable. In a state where the combined character has not appeared, the game system 1 increases the remaining appearable time (specifically, decreases the combining state gauge 223) according to the passage of time, and in a state where the combined character is non-appearable, when the remaining appearable time reaches a predetermined amount (specifically, 0), the game system 1 changes the state of the combined character such that the combined character is appearable. According to the above, the game system 1 can cause the combined character to automatically (in other words, forcibly) leave under a certain condition, and can cause the combined character to leave by an instruction of the user. In addition, when the user causes the combined character to leave by their own instruction, it is easier to perform combining again than when the combined character automatically leaves. Accordingly, an option of whether or not to manually cause the combined character to leave can be provided to the user, so that the strategic characteristics of the game can be improved.

In the exemplary embodiment, while combining is being performed, when the above command is executed for the combined character, the combining state gauge 223 is increased by an amount that is set for each command That is, in a state where the combined character is the operation target character, the game system 1 decreases the remaining appearable time in accordance with the command associated with the combined character being executed. As described above, in the exemplary embodiment, for the combined character, the command can be executed without waiting for the command gauge to become accumulated, whereas it is made easier to quickly cancel the combining, by increasing the combining state gauge 223 in accordance with execution of the command. Accordingly, the difficulty of the game is prevented from becoming excessively low by frequently executing the command in a situation in which the combined character has appeared, so that the strategic characteristics of the game can be improved. In addition, while combining is being performed, an option of whether to execute many commands for the combined character or execute less commands to lengthen the time of the combining can be provided to the user, which also can improve the strategic characteristics of the game.

The method for increasing the combining state gauge 223 is discretionary. For example, in other embodiments, the combining state gauge 223 may be increased only according to the passage of time, or may be increased only in accordance with execution of the command. In addition, in other embodiments, the game system 1 may increase or decrease the combining state gauge 223 in accordance with use of an item by the playable character, or the like.

As shown in FIG. 12, in the exemplary embodiment, the character state image 209 changes in accordance with combining of playable characters being performed. Specifically, when two playable characters are combined, the images related to the two playable characters in the character state image 209 are integrated. In the example shown in FIG. 12, the images related to the character A and the character B combined are integrated in the character state image 209. Therefore, the user can confirm whether playable characters have been combined, also through the character state image 209.

Moreover, while combining is being performed, in the character state image 209, an image related to the two playable characters corresponding to the combined character includes a combining time gauge 247 related to the combining time of the combined character. Here, the combining time gauge 247 indicates the same value as the combining state gauge 223 described above. That is, the combining time gauge 247 increases according to the passage of time during the combining, and also increases in accordance with execution of the command for the combined character during the combining. In addition, when the combining state gauge 223 reaches the upper limit, the combining time gauge 247 also reaches the upper limit.

Here, the combining state gauge 223 is displayed regardless of whether or not combining is being performed, and is displayed for the combined character (the playable character while combining is not performed) that is the operation target character. On the other hand, the combining time gauge 247 is displayed while combining is being performed, and is not displayed while combining is not performed, but is displayed regardless of whether or not the combined character is the operation target character. Thus, the combining state gauge 223 and the combining time gauge 247 have different display conditions (in other words, different display periods). Therefore, in the exemplary embodiment, by using both the combining state gauge 223 and the combining time gauge 247, more opportunities to check the state related to combining into each combined character can be provided to the user.

In the exemplary embodiment, even when the combined character has appeared, the user can make the above-described character switching instruction to switch the operation target character. Therefore, the user can switch the operation target character from the combined character to a playable character that has not been combined, and also can switch the operation target character from a playable character that has not been combined, to the combined character.

When the combined character has appeared, switching of the operation target character is performed with the combined two playable characters being treated as one character. For example, in the case where the above-described switching order is the order of the character A, the character B, the character C, the character D, the character E, and the character F, a situation in which the character C and the character D are combined is considered. In this situation, when the character B is the operation target character, if the first L-button 38 is operated, the operation target character is switched from the character B to the combined character, and if the first L-button 38 is operated again, the operation target character is switched from the combined character to the character E. Accordingly, the inconvenience that the operation target character does not change even when the operation for the character switching instruction is performed, can be prevented.

In the exemplary embodiment, in addition to performing combining of the operation target character by the combining instruction made by the user, combining of a playable character that is not the operation target character may be performed as a result of the action of this playable character being automatically controlled. Such automatic combining of the playable character can be executed regardless of whether or not the operation target character is a combined character. In addition, as for the combined character corresponding to the above playable character, the game system 1 manages the combining state gauge in the same manner as for the combined character corresponding to the operation target character, and controls whether the combined character is in a combinable state or a non-combinable state. In the exemplary embodiment, the combining state gauge of a playable character or a combined character that is the operation target character is actually displayed.

Due to the above, in the exemplary embodiment, a plurality of combined characters may appear in the game space at the same time. For example, in a period when a combined character appears in response to the combining instruction made by the user, when combining of a playable character that is not the operation target character is automatically performed, two combined characters appear in the game space. In addition, for example, in a period when a combined character appears in response to the combining instruction made by the user, after the user makes the above character switching instruction, two combined characters appear in the game space as a result of making the combining instruction for the playable character that is the operation target character after switching.

Figure 13:
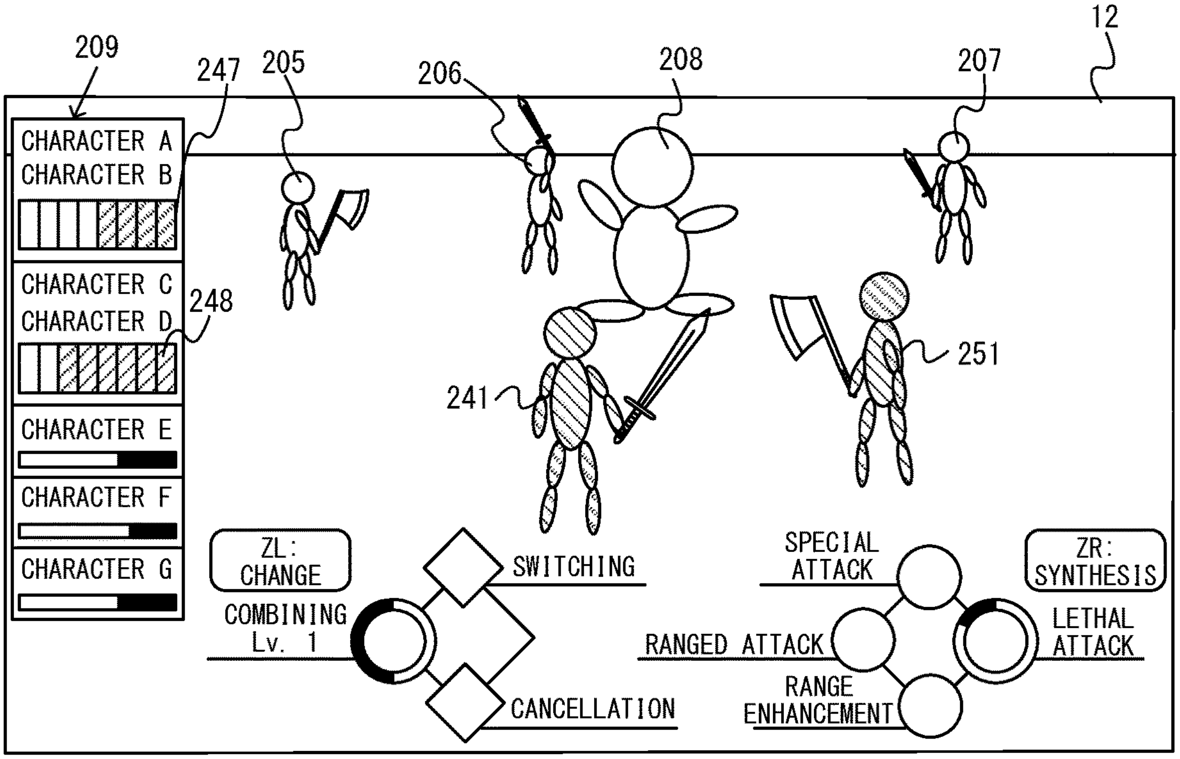
FIG. 13 is a diagram showing an example of the game image in the case where a plurality of combined characters appear.

FIG. 13 is a diagram showing an example of the game image in the case where a plurality of combined characters appear. The example shown in FIG. 13 shows a state where, from the state shown in FIG. 12, a combined character 251 appears as a result of combining of the character C and the character D being performed. In the character state image 209 in the state shown in FIG. 13, images related to the character A and the character B which are being combined are integrated, and images related to the character C and the character D which are being combined are integrated. In addition, the character state image 209 includes the combining time gauge 247 related to the combined character 241 of the character A and character B, and a combining time gauge 248 related to the combined character 251 of the character C and the character D. In addition, in the state shown in FIG. 13, the user can set each of the combined characters 241 and 251 and the playable characters 205 and 205 as the operation target character by the above-described character switching instruction.

As described above, in the exemplary embodiment, for a combined character associated with a combination of playable characters, the game system 1 controls the state of the combined character about whether or not the combined character is appearable (i.e., a combinable state or a non-combinable state). In a state where two playable characters are each the operation target character or a combined character of the two playable characters is the operation target character, if another combined character different from this combined character is in a combinable state, the game system 1 automatically performs control to cause the other combined character to appear in the virtual space. Accordingly, by causing the combined character to automatically appear, a situation (specifically, a situation of whether or not playable characters have become a combined character) in the battle scene can be made more diverse. Thus, the number of options that can be taken by the user in the battle scene can be increased, so that the strategic characteristics of the game can be improved further.

[3. Specific Example of Processing in Game System]

Next, a specific example of information processing in the game system 1 will be described with reference to FIGS. 14 to 17.

Figure 14:
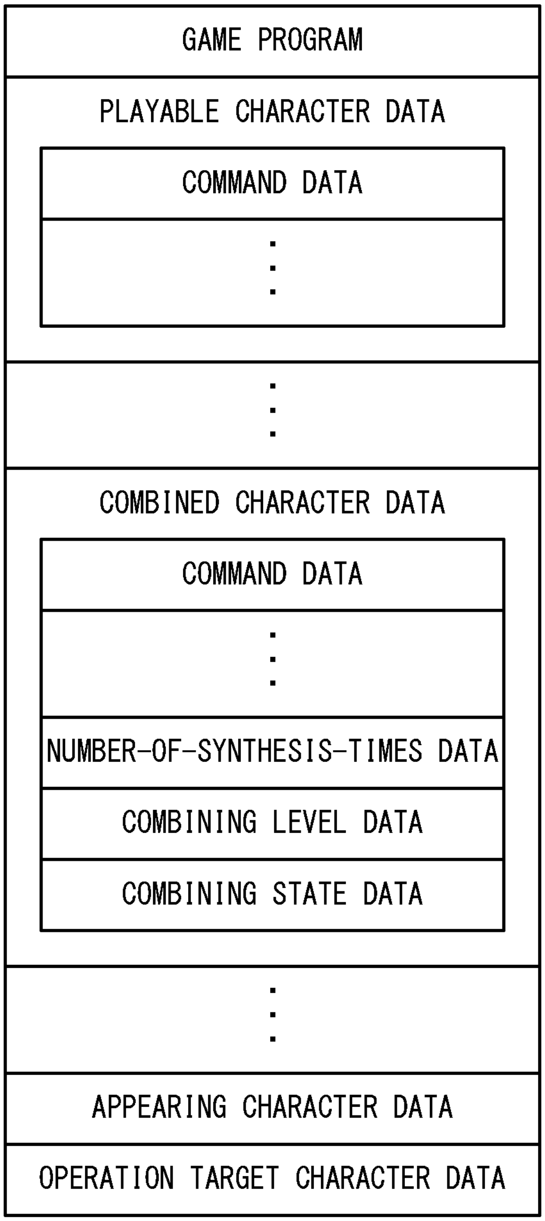
FIG. 14 is a diagram showing an example of various types of data used for information processing in the non-limiting game system.

FIG. 14 is a diagram showing an example of various types of data used for information processing in the game system 1. The various types of data shown in FIG. 14 are stored in a storage medium (e.g., the flash memory 84, the DRAM 85, and/or the memory card attached to the slot 23) accessible by the main body apparatus 2.

As shown in FIG. 14, the game system 1 stores therein a game program. The game program is a program for executing the game processing (specifically, processes shown in FIGS. 17 to 19) of the exemplary embodiment. The game system 1 further stores therein playable character data, combined character data, appearing character data, and operation target character data.

The playable character data is data related to playable characters that are appearable in a battle scene. The game system 1 stores therein the playable character data for each playable character. The playable character data includes command data related to each command associated with the playable character. The playable character data includes data indicating various types of information (e.g., the ability and the state of the playable character, etc.) related to the playable character, in addition to the command data.

The command data includes data indicating the content of a command, data indicating a command instruction image corresponding to the command (in other words, an operation button assigned to the command), and data indicating the amount of a command gauge (i.e., the length of the gauge) corresponding to the command. The playable character data includes the command data for each command associated with the playable character.

The combined character data is data related to combined characters that are appearable in a battle scene. The game system 1 stores therein the combined character data for each combined character. The combined character data is associated with the playable character data related to the original playable characters for the combined character.

The combined character data includes command data related to each command associated with the combined character. Similar to the command data included in the playable character data, the command data includes data indicating the content of a command, and data indicating a command instruction image corresponding to the command. In addition, for a command for which a command gauge is set (specifically, the command of the third group), the command data includes data indicating the amount of the command gauge corresponding to the command. The combined character data includes the command data for each command associated with the combined character.

The combined character data includes number-of-synthesis-times data, combining level data, and combining state data. The number-of-synthesis-times data indicates the above-described number of times of synthesized command execution. The combining level data includes data indicating the combining level of the combined character. At the start of a battle scene, the combining level data indicates a predetermined value (e.g., 1). The combining state data includes data indicating whether the combined character is in a combinable state and a non-combinable state, and data indicating the amount of the combining state gauge related to the combined character. The combined character data includes, in addition to the command data, various types of information (e.g., ability, state, etc.) regarding the combined character.

The appearing character data indicates the characters appearing in the game space among the playable characters and the combined characters. For example, the appearing character data is updated in accordance with a combined character appearing as a result of two playable characters being combined.

The operation target character data indicates a character that is the operation target character, among the playable characters and the combined character appearing in the game space. For example, the operation target character data is updated in accordance with the above-described character switching instruction being made. At the start of battle scene processing (FIG. 15) described later, an operation target character is determined according to a predetermined rule (the specific content of the rule is discretionary).

In addition to the data shown in FIG. 14, the game system 1 includes data related to enemy characters and fellow characters (e.g., data indicating the ability and the state of each character).

Figure 15:
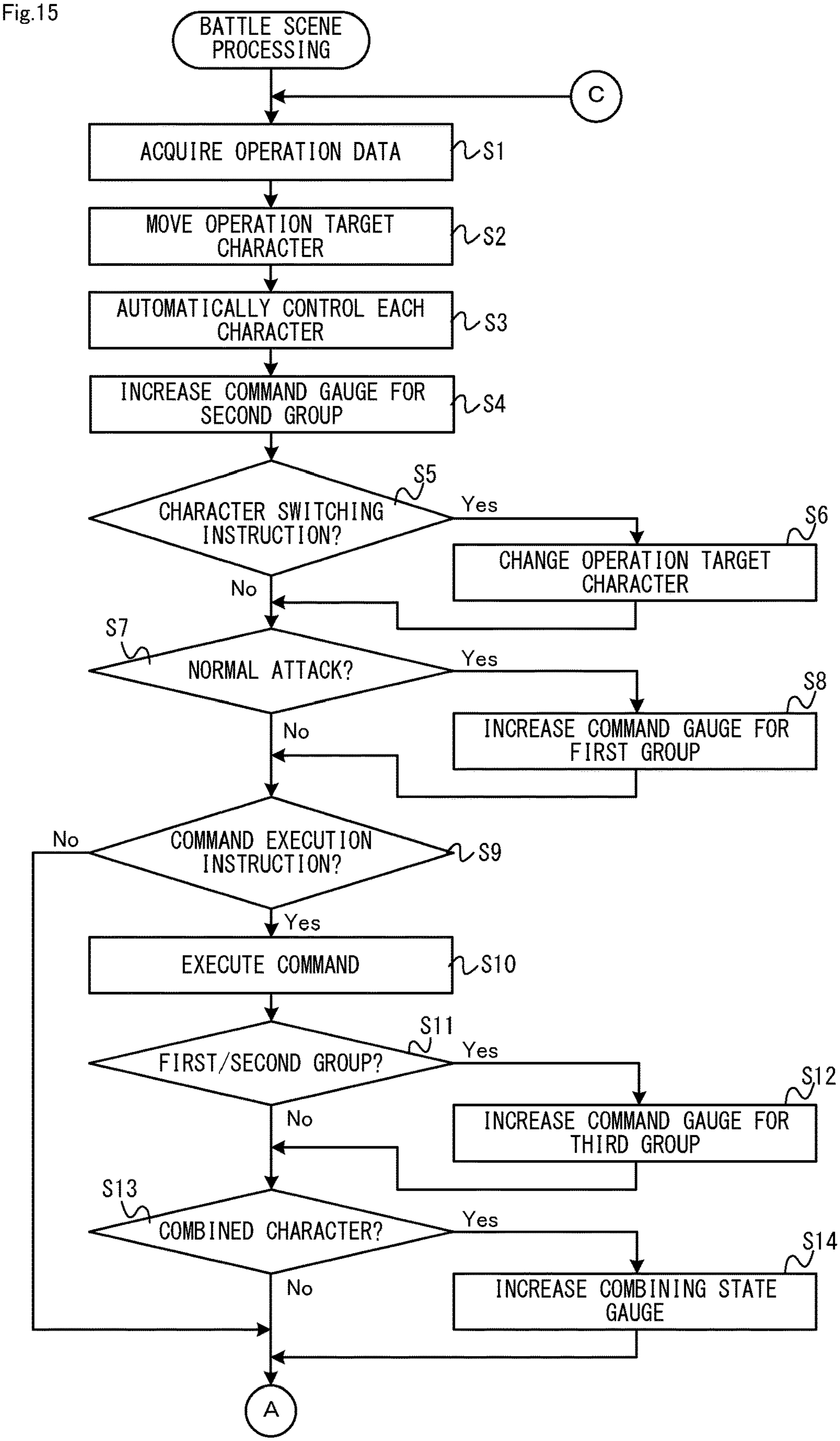
FIG. 15 is a flowchart showing an example of a flow of battle scene processing executed by the non-limiting game system.
Figure 16:
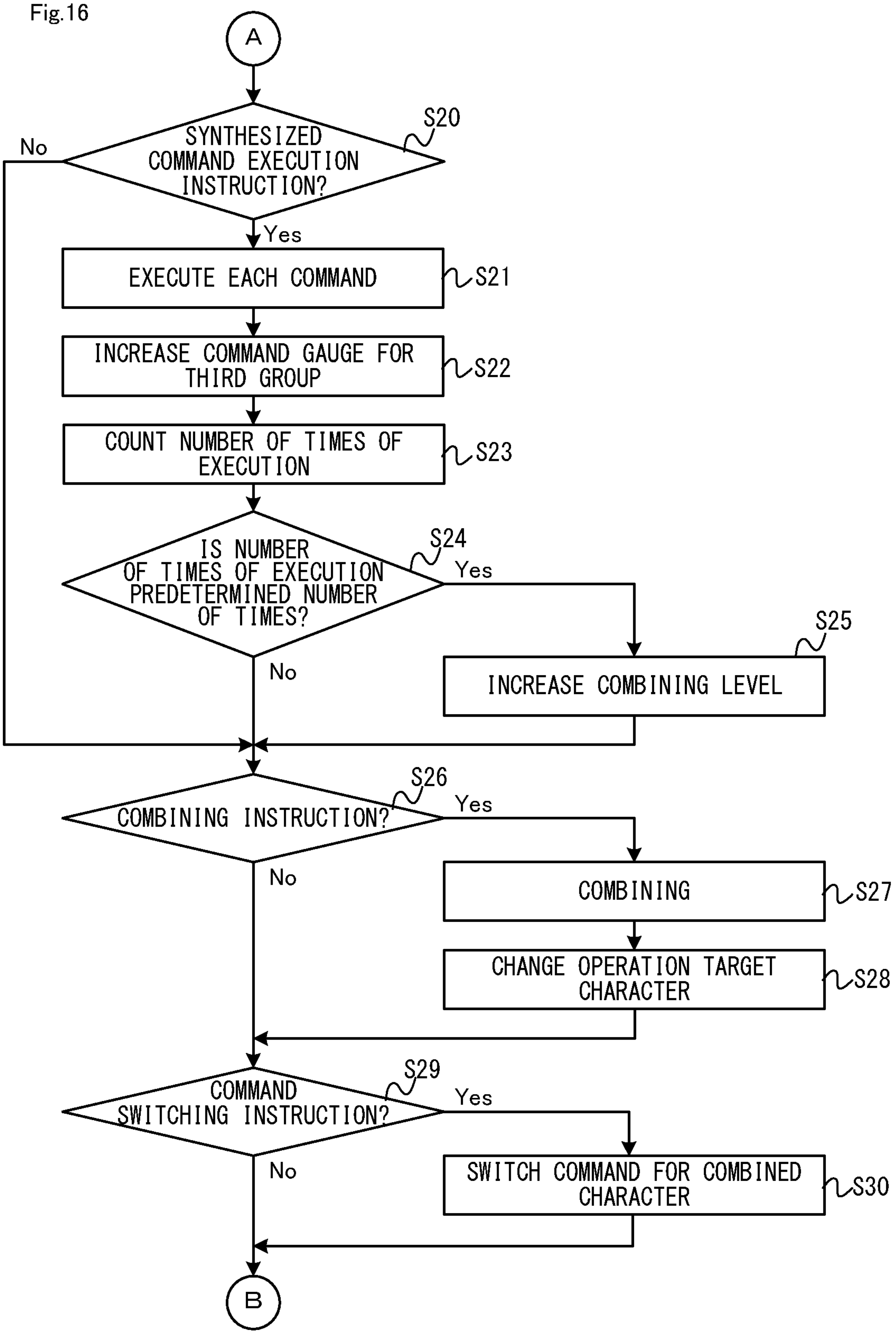
FIG. 16 is a flowchart showing an example of the flow of the battle scene processing executed by the non-limiting game system.
Figure 17:
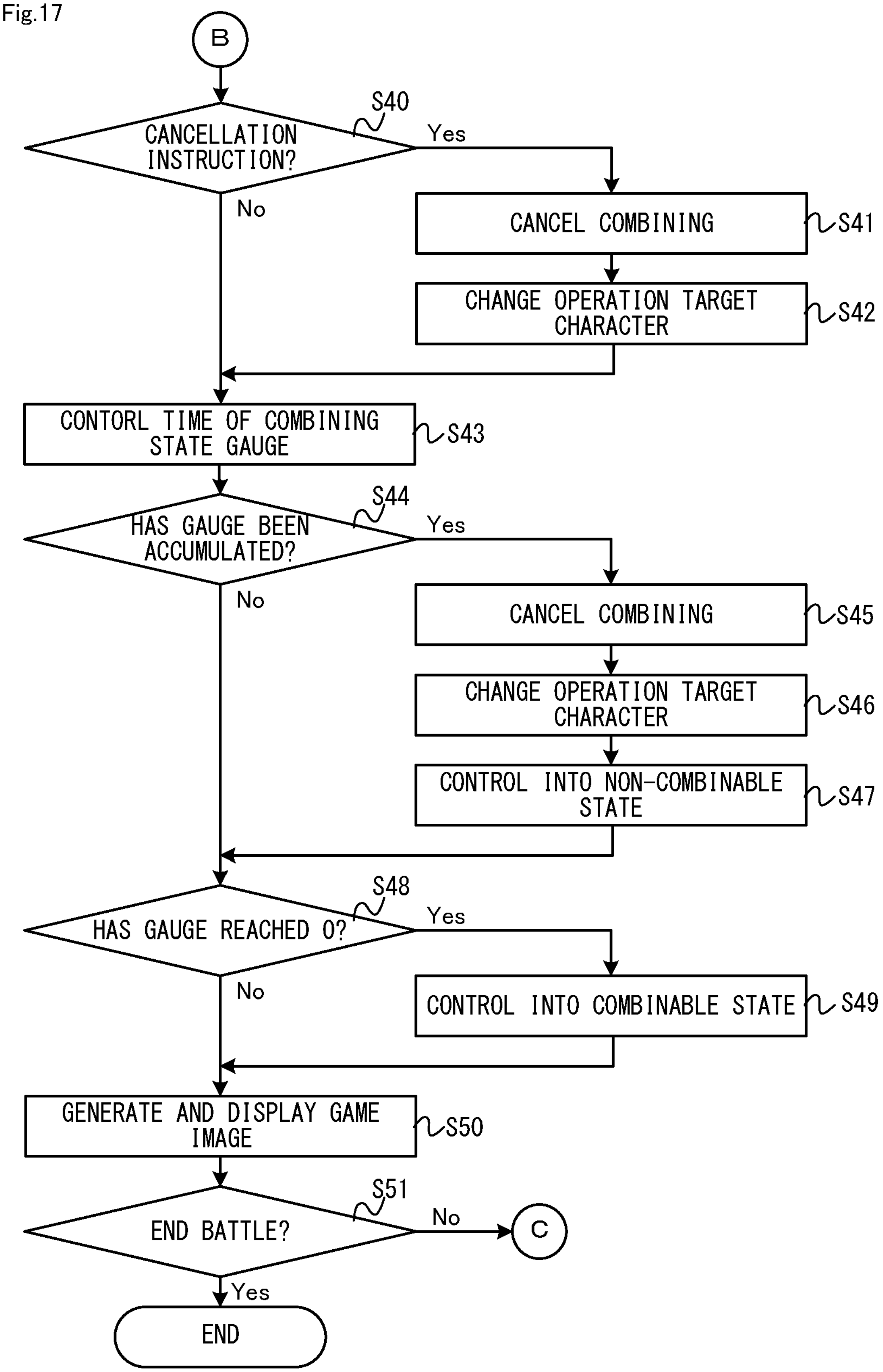
FIG. 17 is a flowchart showing an example of the flow of the battle scene processing executed by the non-limiting game system.

FIGS. 15 to 17 are flowcharts showing an example of a flow of the battle scene processing executed by the game system 1. The battle scene processing is game processing executed in a battle scene during the game. During execution of the game program, the battle scene processing is started, for example, when a battle scene is started (e.g., when a playable character encounters an enemy character in a game field).

In the exemplary embodiment, the processor 81 of the main body apparatus 2 executes the game program stored in the game system 1 to execute processes in steps shown in FIGS. 15 to 17. However, in another embodiment, a part of the processes in the steps may be executed by a processor (e.g., a dedicated circuit or the like) other than the above processor. If the game system 1 is communicable with another information processing apparatus (e.g., a server), a part of the processes in the steps shown in FIGS. 15 to 17 may be executed by another information processing apparatus. The processes in the steps shown in FIGS. 15 to 17 are merely examples, and the processing order of the steps may be changed or another process may be executed in addition to (or instead of) the processes in the steps as long as similar results can be obtained.

The processor 81 executes the processes in the steps shown in FIGS. 15 to 17 by using a memory (e.g., the DRAM 85). That is, the processor 81 stores information (in other words, data) obtained in each process step, in the memory, and reads out the information from the memory when using the information for the subsequent process steps.

In step S1 shown in FIG. 15, the processor 81 acquires operation data indicating an operation input performed by the user. That is, the processor 81 acquires, at appropriate timing, operation data received from each controller via the controller communication section 83 and/or the terminals 17 and 21, and stores the operation data in the memory. Next to step S1, the process in step S2 is executed.

In step S2, the processor 81 moves the operation target character in the game space according to an operation of the user. That is, the processor 81 refers to the operation data acquired in step S1, and moves the operation target character according to an operation on the analog stick 32 of the left controller 3 in a direction designated by the operation. Next to step S2, the process in step S3 is executed.

In step S3, the processor 81 automatically controls the action of each character (i.e., playable characters, a combined character, a fellow character, and an enemy character) appearing in the battle scene. Specifically, the processor 81 controls the operation target character such that the operation target character automatically performs a normal attack as described above in "[2. Outline of processing on game system]". The processor 81 controls the playable characters and the combined character other than the operation target character such that these characters automatically perform actions such as movement, a normal attack, and actions corresponding to commands. In addition, the playable characters are also controlled such that combining is automatically performed when a combining condition is satisfied. When combining has been performed for playable characters, the processor 81 updates the appearing character data stored in the memory, such that the two playable characters that are the original characters for the combining leave the game space and the combined character thereof appears in the game space. In addition, the processor 81 controls the fellow character and the enemy character such that these characters automatically perform various actions such as movement and attack. Moreover, the processor 81 changes the state of characters affected by the actions performed by the above characters (e.g., decreases the physical strength of the enemy character attacked by the playable character). Next to step S3, the process in step S4 is executed.

In step S4, the processor 81 increases the command gauge related to the command of the above-described second group among the commands related to each playable character. Specifically, the processor 81 updates the content of the command data included in the playable character data stored in the memory, such that the command data indicates the amount of the command gauge after increase. Here, in the exemplary embodiment, a processing loop of steps S1 to S51 shown in FIGS. 15 to 17 is repeatedly executed once every predetermined time period (e.g., one-frame time). Therefore, in step S4, the processor 81 increases the command gauge related to the command of the second group by a predetermined unit amount. As described above, the unit amount may be set for each command. The command gauge is gradually increased according to the passage of time by the process in step S4 being repeatedly executed. Next to step S4, the process in step S5 is executed.

In step S5, the processor 81 determines whether or not a character switching instruction has been performed by the user. That is, the processor 81 refers to the operation data acquired in step S1, and determines whether or not an operation of pressing the first L-button 38 of the left controller 3 or the first R-button 60 of the right controller 4 has been performed in a state where the ZL-button 39 of the left controller 3 is pressed. When the determination result in step S5 is positive, the process in step S6 is executed. On the other hand, when the determination result in step S5 is negative, the process in step S6 is skipped and the process in step S7 is executed.

In step S6, the processor 81 changes the operation target character. Specifically, when an operation of pressing the first L-button 38 has been performed as the character switching instruction, the processor 81 changes the operation target character according to the above-described switching order, and when an operation of pressing the first R-button 60 has been performed as the character switching instruction, the processor 81 changes the operation target character according to the order opposite to the switching order. In addition, the processor 81 updates the operation target character data stored in the memory, such that the operation target character data indicates the operation target character after change. Next to step S6, the process in step S7 is executed.

In step S7, the processor 81 determines whether or not a normal attack has been performed on the enemy character by a playable character as a result of the control by the process in step S3. When the determination result in step S7 is positive, the process in step S8 is executed. On the other hand, when the determination result in step S7 is negative, the process in step S8 is skipped and the process in step S9 is executed.

In step S8, the processor 81 increases the command gauge related to the command of the above-described first group among the commands related to the playable character determined to have performed the normal attack in step S7. Specifically, the processor 81 updates the content of the command data included in the playable character data stored in the memory, such that the command data indicates the amount of the command gauge after increase. As described above, the amount by which the command gauge is increased according to the normal attack may be set for each command Next to step S8, the process in step S9 is executed.

In step S9, the processor 81 determines whether or not an instruction to execute a command has been performed by the user. The command determined in step S9 to be executed is a command other than the above-described synthesized commands Specifically, the processor 81 refers to the operation data acquired in step S1, and determines whether or not any of the operations respectively corresponding to the command instruction images 211 to 217 has been performed in a state where the command is executable and the above-described synthesis instruction (i.e., an operation of pressing the ZR-button 61 of the right controller 4) has not been performed. When the determination result in step S9 is positive, the process in step S10 is executed. On the other hand, when the determination result in step S9 is negative, the processes in steps S10 to S14 are skipped and the process in step S20 (see FIG. 16) described later is executed.

In step S10, the processor 81 executes the command for which the instruction has been performed in step S9. That is, the processor 81 causes the operation target character to perform an action corresponding to the command. In addition, the processor 81 changes the state of a character affected by the action. Furthermore, when a command gauge is set for the executed command, the processor 81 updates the command data stored in the memory for the command, such that the command gauge becomes 0. Next to step S10, the process in step S11 is executed.

In step S11, the processor 81 determines whether or not the command for which the instruction has been performed in step S9 is a command of the first or second group. When the determination result in step S11 is positive, the process in step S12 is executed. On the other hand, when the determination result in step S11 is negative, the process in step S12 is skipped and the process in step S13 is executed.

In step S12, the processor 81 increases the command gauge related to the command of the above-described third group among the commands related to the playable character or the combined character that has performed the action corresponding to the command in step S10. Specifically, the processor 81 updates the content of the command data included in the playable character data stored in the memory, such that the command data indicates the amount of the command gauge after increase. As described above, the amount by which the command gauge is increased in accordance with execution of another command may be set for each command Next to step S12, the process in step S13 is executed.

In step S13, the processor 81 determines whether or not the character that has performed the action corresponding to the command in step S10 is a combined character. When the determination result in step S13 is positive, the process in step S14 is executed. On the other hand, when the determination result in step S13 is negative, the process in step S14 is skipped and the process in step S20 (see FIG. 16) described later is executed.

In step S14, the processor 81 increases the combining state gauge related to the combined character that has performed the action corresponding to the command in step S10. Specifically, the processor 81 updates the content of the combining state data included in the combined character data stored in the memory, such that the combining state data indicates the amount of the combining state gauge after increase. The amount by which the combining state gauge is increased may be set for each combined character. Next to the step S14, the process in step S20 (see FIG. 16) is executed.

In step S20 shown in FIG. 16, the processor 81 determines whether or not an instruction to execute synthesized commands has been performed by the user. That is, the processor 81 refers to the operation data acquired in step S1, and determines whether or not any of the operations respectively corresponding to the command instruction images 211 to 217 has been performed in a state where command synthesis is possible and the above synthesis instruction has been performed. When the determination result in step S20 is positive, the process in step S21 is executed. On the other hand, when the determination result in step S20 is negative, the processes in steps S21 to S25 are skipped and the process in step S26 described later is executed.

In step S21, the processor 81 executes the commands for which the instruction has been performed in step S20. That is, the processor 81 causes the operation target character to perform each of the actions corresponding to the two commands for which the instruction has been performed and which are synthesized. In addition, the processor 81 changes the state of a character affected by the actions. Furthermore, the processor 81 updates the command data stored in the memory for the executed two commands, such that the command gauges related to the two commands become 0. Next to step S21, the process in step S22 is executed.

In step S22, the processor 81 increases the command gauge related to the command of the above-described third group among the commands related to the playable character that has performed the actions corresponding to the commands in step S21. Specifically, the processor 81 updates the content of the command data included in the playable character data stored in the memory, such that the command data indicates the amount of the command gauge after increase. Next to step S22, the process in step S23 is executed.

In the exemplary embodiment, when the command gauge reaches the upper limit as a result of the command gauge being increased by the process in step S4, S8, S12, or S22, this means that the command related to the command gauge is controlled to be brought into an executable state.

In step S23, the processor 81 counts the number of times of synthesized command execution. That is, the processor 81 updates the number-of-synthesis-times data stored in the memory, such that the number-of-synthesis-times data indicates the number of times that is increased by 1 from the number of times before update. The number-of-synthesis-times data updated here is the number-of-synthesis-times data related to the combined character corresponding to the playable character that has performed the actions corresponding to the commands in step S21. Next to step S23, the process in step S24 is executed.

In step S24, the processor 81 determines whether or not the number of times of synthesized command execution counted in step S23 has reached a predetermined number of times for increasing a combining level. When the determination result in step S24 is positive, the process in step S25 is executed. On the other hand, when the determination result in step S24 is negative, the process in step S25 is skipped and the process in step S26 is executed.

In step S25, the processor 81 increases the combining level for the combined character corresponding to the playable character that has performed the actions corresponding to the commands in step S21, by 1. The processor 81 updates the combining level data included in the combined character data stored in the memory for the combined character, such that the combining level data indicates the value after increase. Next to step S25, the process in step S26 is executed.

In step S26, the processor 81 determines whether or not the above-described combining instruction has been performed by the user. That is, the processor 81 refers to the operation data acquired in step S1, and determines whether or not an operation of pressing the left direction button 36 of the left controller 3 has been performed in a state where the combining condition for the combined character corresponding to the operation target character is satisfied. When the determination result in step S26 is positive, the process in step S27 is executed. On the other hand, when the determination result in step S26 is negative, the processes in step S27 and S28 are skipped and the process in step S29 described later is executed.

In step S27, the processor 81 combines the operation target character and the playable character corresponding to the operation target character. That is, the processor 81 updates the appearing character data stored in the memory, such that these two characters are caused to leave the game space and the combined character corresponding to the two characters is caused to appear in the game space. For the appearing combined character, an ability corresponding to the combining level indicated by the combining level data stored in the memory is set. Next to step S27, the process in step S28 is executed.

In step S28, the processor 81 changes the operation target character such that the operation target character becomes the combined character that has appeared in the game space in step S27. That is, the processor 81 updates the operation target character data stored in the memory, such that the operation target character data indicates the above combined character. Next to step S28, the process in step S29 is executed.

In step S29, the processor 81 determines whether or not the above-described command switching instruction has been performed by the user. That is, the processor 81 refers to the operation data acquired in step S1, and determines whether or not an operation of pressing the up direction button 35 of the left controller 3 has been performed in a state where the combined character is the operation target character. When the determination result in step S29 is positive, the process in step S30 is executed. On the other hand, when the determination result in step S29 is negative, the process in step S30 is skipped and the process in step S40 (see FIG. 17) described later is executed.

In the step S30, the processor 81 switches the pattern of the commands associated with the combined character that is the operation target character. That is, the processor 81 updates the command data included combined character data stored in the memory for the combined character, such that the command data has a content corresponding to the command pattern after switching. Next to step S30, the process in step S40 (see FIG. 17) is executed.

In step S40 shown in FIG. 17, the processor 81 determines whether or not the above-described cancellation instruction has been performed by the user. That is, the processor 81 refers to the operation data acquired in step S1, and determines whether or not an operation of pressing the down direction button 34 of the left controller 3 has been performed in a state where the combined character is the operation target character. When the determination result in step S40 is positive, the process in step S41 is executed. On the other hand, when the determination result in step S40 is negative, the processes in steps S41 and S42 are skipped and the process in step S43 described later is executed.

In step S41, the processor 81 cancels the combining into the combined character. That is, the processor 81 updates the appearing character data stored in the memory, such that the combined character that is the operation target character is caused to leave the game space and the two original playable characters for the combined character are caused to appear in the game space. Next to step S41, the process in step S42 is executed.

In step S42, the processor 81 changes the operation target character such that the operation target character becomes either one of the two playable characters that have appeared in the game space in step S41. The method for determining one of the two playable characters as the operation target character is discretionary. For example, the processor 81 sets the playable character that has been a primary character for the combined character immediately before the cancellation of the combining, out of the two playable characters, as an operation target character after the end of the combining. The processor 81 updates the operation target character data stored in the memory, such that the operation target character data indicates the playable character determined as the operation target character as described above. Next to step S42, the process in step S43 is executed.

In step S43, the processor 81 controls the combining state gauge related to each combined character, according to the passage of time. Specifically, the processor 81 decreases the combining state gauge related to each combined character that has not appeared in the game space, by a predetermined unit decrease amount, and increases the combining state gauge related to the combined character appearing in the game space, by a predetermined unit increase amount. The unit decrease amount and the unit increase amount may be set for each combined character. Each combining state gauge is gradually increased or decreased according to the passage of time by the process in step S43 being repeatedly executed. The processor 81 updates the content of the combining state data included in each combined character data stored in the memory, such that the combined character data indicates the amount of the combining state gauge after change. Next to step S43, the process in step S44 is executed.

In step S44, the processor 81 determines whether or not the combining state gauge has been accumulated to the upper limit as a result of the process in step S14 or S43. When the determination result in step S44 is positive, the process in step S45 is executed. On the other hand, when the determination result in step S44 is negative, the processes in steps S45 to S47 are skipped and the process in step S48 described later is executed.

In step S45, the processor 81 cancels the combining into the combined character. That is, the processor 81 performs the same process as in step S41, for the combined character for which the combining state gauge determined in step S44 to have been accumulated to the upper limit. Next to step S45, the process in step S46 is executed.

In step S46, the processor 81 changes the operation target character such that the operation target character becomes either one of the two playable characters that have appeared in the game space in step S45. The process in step S46 is the same as the process in step S42. Next to step S46, the process in step S47 is executed.

In step S47, the processor 81 sets the combined character for which the combining has been cancelled in step S45, to be in a non-combinable state. That is, the processor 81 updates the combining state data stored in the memory for the combined character, such that the combining state data has a content indicating a non-combinable state. Next to step S47, the process in step S48 is executed.

In step S48, the processor 81 determines whether or not the combining state gauge has reached 0 as a result of the process in step S43. When the determination result in step S48 is positive, the process in step S49 is executed. On the other hand, when the determination result in step S48 is negative, the process in step S49 is skipped and the process in step S50 is executed.

In step S49, the processor 81 sets the combined character for which the combining state gauge is determined in step S49 to have reached 0, to be in a combinable state. That is, the processor 81 updates the combining state data stored in the memory for the combined character, such that the combining state data has a content indicating a combinable state. When the combined character has already been set to be in a combinable state at the time of the process in step S49, the combinable state of the combined character is maintained. Next to step S49, the process in step S50 is executed.

In step S50, the processor 81 generates a game image reflecting the processing results in steps S1 to S49, and displays the game image on the display 12. That is, the processor 81 generates a game image showing a state where each character performs the actions corresponding to steps S2 and S3 in the game space. In addition, when combining has been performed through the process in step S27 or cancellation of the combining has been performed through the process in step S41 or S45, the processor 81 generates a game image showing a state where the characters appearing in the game space are changed. In this case, the processor 81 further changes the character state image and the command UI image and generates a game image (see FIG. 12 and FIG. 13). For example, according to the combining, the processor 81 changes the images related to the combined two playable characters in the character state image such that these images are integrated, or changes the command UI image to one for the combined character. In addition, when at least any one of the processes in steps S4, S8, S12, S14, S22, S25, S30, and S43 has been executed, the processor 81 generates a game image including a command UI image corresponding to the process (e.g., a command UI image in which the length of the gauge is changed or the content of the command instruction image is changed). Moreover, the processor 81 refers to the operation data acquired in step S1, changes the command UI image according to the operation performed by the user, and generates a game image. For example, when the above synthesis instruction has been performed in a state where command synthesis is possible, the processor 81 generates a command UI image in which two command instruction images corresponding to two commands that can be synthesized are integrated (see FIG. 10). Moreover, for example, when the above character switching instruction has been performed, the processor 81 generates a command UI image including the above-described character switching instruction image (see FIG. 11).

In the exemplary embodiment, in step S50, the game system 1 displays the image on the display 12, but may display the image on another display device (e.g., a monitor connected to the main body apparatus 2) different from the display 12. Next to step S50, the process in step S51 is executed.

In step SM, the processor 81 determines whether or not to end the battle scene. That is, the processor 81 determines whether or not a condition for ending the battle (e.g., all enemy characters have been defeated, or all the playable characters have been defeated) is satisfied. When the determination result in step S51 is negative, the process in step S1 is executed again. Thereafter, a series of the processes in steps S1 to SM is repeatedly executed until it is determined in step SM to end the battle scene. On the other hand, when the determination result in step S48 is positive, the processor 81 ends the battle scene processing shown in FIGS. 15 to 17.

[4. Function and Effect of the Exemplary Embodiment, and Modifications]

As described above, in the exemplary embodiment, the game program is for controlling a battle scene in which a plurality of playable characters fight against an enemy character in a virtual space (a game space as an example) and is configured to cause a computer of an information processing apparatus (e.g., the main body apparatus 2) to execute the following processes.

A process of controlling an action performed by an operation target character to be operated, based on an operation input with any one of the plurality of playable characters as the operation target character (step S2).

The following processes (a) to (g) performed in a state where any one of the plurality of playable characters is the operation target character:

(a) for a plurality of types of commands associated with the playable characters, controlling a state of each command about whether the command is executable or non-executable (steps S4, S8, S12, and S22);

(b) when any one of a plurality of types of first operations respectively corresponding to the plurality of types of commands (as an example, operations corresponding to command instruction images) is performed and the command corresponding to the performed first operation is executable, performing control such that the operation target character performs an action corresponding to the command, and controlling the state of the command such that the command is non-executable (steps S10 and S21);

(c) for a command that is non-executable, when a predetermined condition (as an example, a command gauge is accumulated) set for each command is satisfied, controlling the state of the command such that the command is executable (steps S4, S8, S12, and S22);

(d) automatically controlling an action performed by a character that is not the operation target character among the plurality of playable characters (step S3);

(e) when a second operation (as an example, an operation for the above character switching instruction) is performed, switching the operation target character to another character among the plurality of playable characters (step S6);

(f) for a first special character (as an example, a combined character) associated with a combination of a first set including a first character and a second character included in the plurality of playable characters, controlling a state of a first special character about whether the first special character is appearable or non-appearable (steps S47 and S49); and (g) when a third operation (as an example, an operation for the combining instruction) is performed in a state where a character included in the first set is the operation target character, and the first special character is appearable, performing control such that the first special character appears in the virtual space and is set as the operation target character (steps S27 and S28).

The following processes (h) to (k) performed in a state where the first special character is the operation target character:

(h) when at least any one of the plurality of types of first operations is performed, controlling an action performed by the first special character, such that the first special character performs an action corresponding to a command corresponding to the performed operation and associated with the first special character (step S10);

switching the operation target character from the first special character to a character other than the first set among the plurality of playable characters according to the second operation (step S6);

(j) when a predetermined condition including passage of time is satisfied, controlling the state of the first special character such that the first special character is non-appearable (step S47); and (k) when the first special character is changed to a state where the first special character is non-appearable or when a fourth operation (as an example, an operation for the above cancellation instruction) is performed, switching the operation target character from the first special character to a character included in the first set (steps S42 and S46).

According to the above configuration, by limiting execution of commands by providing a condition for execution of commands, the balance of the game can be maintained such that the difficulty of the game is not excessively decreased, and by making it possible to switch the operation target character and cause the special character to appear at a timing when the commands cannot be executed, many options can be presented to the user in the battle scene. Accordingly, the user can also perform another operation at a timing when the commands cannot be executed in the battle scene, and thus can enjoy the game more in the battle scene. In addition, according to the above configuration, the balance of the game can be maintained by making the special character impossible to appear according to the passage of time.

In the exemplary embodiment, the case where a combined character into which playable characters are combined appears as the special character has been described as an example. In other embodiments, the special character may be a character called by a playable character. In addition, when the special character has appeared, the playable characters corresponding to the special character do not have to leave the virtual space and may remain in the virtual space. Furthermore, when the playable characters remain in the virtual space, each of the playable characters may be able to become the operation target character, or may not necessarily be able to become the operation target character, while the special character is appearing.

In the exemplary embodiment, when a process is executed by using data (including a program) in a certain information processing apparatus, a part of the data required for the process may be transmitted from another information processing apparatus different from the certain information processing apparatus. In this case, the certain information processing apparatus may execute the process by using the data received from the other information processing apparatus and the data stored therein.

In other embodiments, the information processing system may not include some of the components in the above embodiment, and may not execute some of the processes executed in the above embodiment. For example, in order to achieve a specific effect of a part of the above embodiment, the information processing system only needs to include a configuration for achieving the effect and execute a process for achieving the effect, and need not include other configurations and need not execute other processes.

The exemplary embodiment can be used as, for example, a game system or a game program, in order to, for example, present many operation options to a user in a battle scene of a game.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program for causing a computer of an information processing apparatus to control a battle scene in which a plurality of playable characters fight against an enemy character in a virtual space, the game program causing the computer to, in the battle scene, execute controlling an action performed by an operation target character based on an operation input, the operation target character being one of the plurality of playable characters, the game program causing the computer to, in a state where any one of the plurality of playable characters is the operation target character, execute:

for a plurality of types of commands associated with each of the playable characters, controlling a state of each command about whether the command is executable or non-executable;

when any one of a plurality of types of first operations respectively corresponding to the plurality of types of commands is performed and the command corresponding to the performed first operation is executable, performing control such that the operation target character performs an action corresponding to the command, and controlling the state of the command such that the command is non-executable;

for a command that is non-executable, when a predetermined condition set for each command is satisfied, controlling the state of the command such that the command is executable;

automatically controlling an action performed by a character that is not the operation target character among the plurality of playable characters;

when a second operation is performed, switching the operation target character to another character among the plurality of playable characters;

for a first special character associated with a combination of a first set including a first character and a second character included in the plurality of playable characters, controlling a state of a first special character about whether the first special character is appearable or non-appearable; and when a third operation is performed in a state where a character included in the first set is the operation target character, and the first special character is appearable, performing control such that the first special character appears in the virtual space and is set as the operation target character, the game program causing the computer to, in a state where the first special character is the operation target character, execute:

when at least any one of the plurality of types of first operations is performed, controlling an action performed by the first special character, such that the first special character performs an action corresponding to a command corresponding to the performed first operation and associated with the first special character;

switching the operation target character from the first special character to a character other than the first set among the plurality of playable characters according to the second operation;

when a predetermined condition including passage of time is satisfied, controlling the state of the first special character such that the first special character is non-appearable; and when the first special character is changed to a state where the first special character is non-appearable or when a fourth operation is performed, switching the operation target character from the first special character to a character included in the first set.

2. The storage medium according to claim 1, wherein the game program causes the computer to control the state of the first special character such that the first special character is appearable, when a predetermined condition including passage of time is satisfied in a state where the first special character is non-appearable.

3. The storage medium according to claim 2, wherein information indicating the state of the first special character about whether the first special character is appearable or non-appearable includes at least information indicating whether the first special character is appearable or non-appearable and information regarding a remaining appearable time, the game program causes the computer to, in a state where the first special character appears, decrease the remaining appearable time at least according to passage of time;

when the remaining appearable time runs out, change the state of the first special character such that the first special character is non-appearable, and perform control such that the first special character leaves the virtual space; and when the fourth operation is performed in a state where the remaining appearable time remains, perform control such that the first special character leaves the virtual space with the state of the first special character kept as a state where the first special character is appearable, and the game program causes the computer to, in a state where the first special character does not appear, increase the remaining appearable time according to passage of time; and when the remaining appearable time reaches a predetermined amount in a state where the first special character is non-appearable, change the state of the first special character such that the first special character is appearable.

4. The storage medium according to claim 3, wherein the game program causes the computer to, in a state where the first special character is the operation target character, decrease the remaining appearable time in accordance with a command associated with the first special character being executed.

5. The storage medium according to claim 1, wherein a first command pattern and a second command pattern are associated with the first special character, the first command pattern corresponding to the first character and being a pattern of commands corresponding to at least any one of the plurality of types of first operations, and the second command pattern corresponding to the second character and being a pattern of commands corresponding to at least any one of the plurality of types of first operations, and the game program further causes the computer to, when a fifth operation is performed in a state where the first special character is the operation target character, change a pattern of commands used for the first special character, from the first command pattern to the second command pattern or from the second command pattern to the first command pattern.

6. The storage medium according to claim 1, wherein the game program further causes the computer to:

automatically control attack actions performed on the enemy character by the plurality of playable characters; and for at least one command among the plurality of types of commands, when a parameter which increases in accordance with the attack action being performed reaches a predetermined amount set for each command in a state where the command is non-executable, control a state of the command such that the command is executable.

7. The storage medium according to claim 1, wherein the game program causes the computer to, for at least one command among the plurality of types of commands, when a predetermined time set for each command elapses in a state where the command is non-executable, control a state of the command such that the command is executable.

8. The storage medium according to claim 1, wherein the game program further causes the computer to:

automatically control attack actions performed on the enemy character by the plurality of playable characters;

for a command of a first group among the plurality of types of commands, when a parameter which increases in accordance with the attack action being performed reaches a predetermined amount set for each command in a state where the command is non-executable, control a state of the command such that the command is executable;

for a command of a second group among the plurality of types of commands, when a predetermined time set for each command elapses in a state where the command is non-executable, control a state of the command such that the command is executable; and for a set of any one command of the first group and any one command of the second group, when a sixth operation is performed in a state where both commands in the set are executable, control an action corresponding to a combination of the set of the commands and performed by the operation target character, and control states of both commands in the set such that the commands are non-executable.

9. The storage medium according to claim 1, wherein the game program further causes the computer to for at least one command among the plurality of types of commands, when a parameter which increases in accordance with another command among the plurality of types of commands being executed reaches a predetermined amount in a state where the command is non-executable, control a state of the command such that the command is executable.

10. The storage medium according to claim 1, wherein the game program further causes the computer to:

for a second special character associated with a combination of a second set including a third character and a fourth character included in the plurality of playable characters, control a state of the second special character about whether the second special character is appearable or non-appearable; and when the second special character is appearable in a state where any one of the first character, the second character, and the first special character is the operation target character, automatically perform control such that the second special character appears in the virtual space.

11. An information processing apparatus for controlling a battle scene in which a plurality of playable characters fight against an enemy character in a virtual space, the information processing apparatus comprising a processor, the processor:

controlling an action performed by an operation target character based on an operation input, the operation target character being one of the plurality of playable characters;

in a state where any one of the plurality of playable characters is the operation target character, for a plurality of types of commands associated with each of the playable characters, controlling a state of each command about whether the command is executable or non-executable, when any one of a plurality of types of first operations respectively corresponding to the plurality of types of commands is performed and the command corresponding to the performed first operation is executable, performing control such that the operation target character performs an action corresponding to the command, and controlling the state of the command such that the command is non-executable, for a command that is non-executable, when a predetermined condition set for each command is satisfied, controlling the state of the command such that the command is executable, automatically controlling an action performed by a character that is not the operation target character among the plurality of playable characters, when a second operation is performed, switching the operation target character to another character among the plurality of playable characters, for a first special character associated with a combination of a first set including a first character and a second character included in the plurality of playable characters, controlling a state of a first special character about whether the first special character is appearable or non-appearable, and when a third operation is performed in a state where a character included in the first set is the operation target character, and the first special character is appearable, performing control such that the first special character appears in the virtual space and is set as the operation target character; and in a state where the first special character is the operation target character, when at least any one of the plurality of types of first operations is performed, controlling an action performed by the first special character, such that the first special character performs an action corresponding to a command corresponding to the performed first operation and associated with the first special character, switching the operation target character from the first special character to a character other than the first set among the plurality of playable characters according to the second operation, when a predetermined condition including passage of time is satisfied, controlling the state of the first special character such that the first special character is non-appearable, and when the first special character is changed to a state where the first special character is non-appearable or when a fourth operation is performed, switching the operation target character from the first special character to a character included in the first set.

12. An information processing system for controlling a battle scene in which a plurality of playable characters fight against an enemy character in a virtual space, the information processing system comprising a processor, the processor:

controlling an action performed by an operation target character based on an operation input, the operation target character being one of the plurality of playable characters;

in a state where any one of the plurality of playable characters is the operation target character, for a plurality of types of commands associated with each of the playable characters, controlling a state of each command about whether the command is executable or non-executable, when any one of a plurality of types of first operations respectively corresponding to the plurality of types of commands is performed and the command corresponding to the performed first operation is executable, performing control such that the operation target character performs an action corresponding to the command, and controlling the state of the command such that the command is non-executable, for a command that is non-executable, when a predetermined condition set for each command is satisfied, controlling the state of the command such that the command is executable, automatically controlling an action performed by a character that is not the operation target character among the plurality of playable characters, when a second operation is performed, switching the operation target character to another character among the plurality of playable characters, for a first special character associated with a combination of a first set including a first character and a second character included in the plurality of playable characters, controlling a state of a first special character about whether the first special character is appearable or non-appearable, and when a third operation is performed in a state where a character included in the first set is the operation target character, and the first special character is appearable, performing control such that the first special character appears in the virtual space and is set as the operation target character; and in a state where the first special character is the operation target character, when at least any one of the plurality of types of first operations is performed, controlling an action performed by the first special character, such that the first special character performs an action corresponding to a command corresponding to the performed first operation and associated with the first special character, switching the operation target character from the first special character to a character other than the first set among the plurality of playable characters according to the second operation, when a predetermined condition including passage of time is satisfied, controlling the state of the first special character such that the first special character is non-appearable, and when the first special character is changed to a state where the first special character is non-appearable or when a fourth operation is performed, switching the operation target character from the first special character to a character included in the first set.

13. The information processing system according to claim 12, wherein the processor controls the state of the first special character such that the first special character is appearable, when a predetermined condition including passage of time is satisfied in a state where the first special character is non-appearable.

14. The information processing system according to claim 13, wherein information indicating the state of the first special character about whether the first special character is appearable or non-appearable includes at least information indicating whether the first special character is appearable or non-appearable and information regarding a remaining appearable time, in a state where the first special character appears, the processor:

decreases the remaining appearable time at least according to passage of time;

when the remaining appearable time runs out, changes the state of the first special character such that the first special character is non-appearable, and performs control such that the first special character leaves the virtual space; and when the fourth operation is performed in a state where the remaining appearable time remains, performs control such that the first special character leaves the virtual space with the state of the first special character kept as a state where the first special character is appearable, and in a state where the first special character does not appear, the processor:

increases the remaining appearable time according to passage of time; and when the remaining appearable time reaches a predetermined amount in a state where the first special character is non-appearable, changes the state of the first special character such that the first special character is appearable.

15. The information processing system according to claim 14, wherein, in a state where the first special character is the operation target character, the processor decreases the remaining appearable time in accordance with a command associated with the first special character being executed.

16. The information processing system according to claim 12, wherein a first command pattern and a second command pattern are associated with the first special character, the first command pattern corresponding to the first character and being a pattern of commands corresponding to at least any one of the plurality of types of first operations, and the second command pattern corresponding to the second character and being a pattern of commands corresponding to at least any one of the plurality of types of first operations, and when a fifth operation is performed in a state where the first special character is the operation target character, the processor further changes a pattern of commands used for the first special character, from the first command pattern to the second command pattern or from the second command pattern to the first command pattern.

17. The information processing system according to claim 12, wherein the processor further:

automatically controls attack actions performed on the enemy character by the plurality of playable characters; and for at least one command among the plurality of types of commands, when a parameter which increases in accordance with the attack action being performed reaches a predetermined amount set for each command in a state where the command is non-executable, controls a state of the command such that the command is executable.

18. The information processing system according to claim 12, wherein, for at least one command among the plurality of types of commands, when a predetermined time set for each command elapses in a state where the command is non-executable, the processor controls a state of the command such that the command is executable.

19. The information processing system according to claim 12, wherein the processor further:

automatically controls attack actions performed on the enemy character by the plurality of playable characters;

for a command of a first group among the plurality of types of commands, when a parameter which increases in accordance with the attack action being performed reaches a predetermined amount set for each command in a state where the command is non-executable, controls a state of the command such that the command is executable;

for a command of a second group among the plurality of types of commands, when a predetermined time set for each command elapses in a state where the command is non-executable, controls a state of the command such that the command is executable; and for a set of any one command of the first group and any one command of the second group, when a sixth operation is performed in a state where both commands in the set are executable, controls an action corresponding to a combination of the set of the commands and performed by the operation target character, and control states of both commands in the set such that the commands are non-executable.

20. The information processing system according to claim 12, wherein, for at least one command among the plurality of types of commands, when a parameter which increases in accordance with another command among the plurality of types of commands being executed reaches a predetermined amount in a state where the command is non-executable, the processor further controls a state of the command such that the command is executable.

21. The information processing system according to claim 12, wherein the processor further:

for a second special character associated with a combination of a second set including a third character and a fourth character included in the plurality of playable characters, controls a state of the second special character about whether the second special character is appearable or non-appearable; and when the second special character is appearable in a state where any one of the first character, the second character, and the first special character is the operation target character, automatically performs control such that the second special character is caused to appear in the virtual space.

22. A game processing method executed in an information processing system, the game processing method being for controlling a battle scene in which a plurality of playable characters fight against an enemy character in a virtual space, the information processing system:

controlling an action performed by an operation target character based on an operation input, the operation target character being one of the plurality of playable characters;

in a state where any one of the plurality of playable characters is the operation target character, for a plurality of types of commands associated with each of the playable characters, controlling a state of each command about whether the command is executable or non-executable, when any one of a plurality of types of first operations respectively corresponding to the plurality of types of commands is performed and the command corresponding to the performed first operation is executable, performing control such that the operation target character performs an action corresponding to the command, and controlling the state of the command such that the command is non-executable, for a command that is non-executable, when a predetermined condition set for each command is satisfied, controlling the state of the command such that the command is executable, automatically controlling an action performed by a character that is not the operation target character among the plurality of playable characters, when a second operation is performed, switching the operation target character to another character among the plurality of playable characters, for a first special character associated with a combination of a first set including a first character and a second character included in the plurality of playable characters, controlling a state of a first special character about whether the first special character is appearable or non-appearable, and when a third operation is performed in a state where a character included in the first set is the operation target character, and the first special character is appearable, performing control such that the first special character appears in the virtual space and is set as the operation target character; and in a state where the first special character is the operation target character, when at least any one of the plurality of types of first operations is performed, controlling an action performed by the first special character, such that the first special character performs an action corresponding to a command corresponding to the performed first operation and associated with the first special character, switching the operation target character from the first special character to a character other than the first set among the plurality of playable characters according to the second operation, when a predetermined condition including passage of time is satisfied, controlling the state of the first special character such that the first special character is non-appearable, and when the first special character is changed to a state where the first special character is non-appearable or when a fourth operation is performed, switching the operation target character from the first special character to a character included in the first set.

* * * * *